US012799798B2

(12) United States Patent
Lan et al.

(10) Patent No.: US 12,799,798 B2
(45) Date of Patent: Nov. 17, 2026

(54) VEHICLE CONTROL METHOD AND APPARATUS, AND VEHICLE

(71) Applicant: Yinwang Intelligent Technologies Co., Ltd., Shenzhen (CN)

(72) Inventors: Hongyu Lan, Shenzhen (CN); Xiaofeng Liao, Shenzhen (CN); Jinghuan Yang, Shanghai (CN); Sifan Wu, Shanghai (CN); Qiuyuan Tang, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/055,067

(22) Filed: Feb. 17, 2025

(65) Prior Publication Data

US 2025/0230698 A1 Jul. 17, 2025

Related U.S. Application Data

(63) Continuation of application No. PCT/CN2023/104647, filed on Jun. 30, 2023.

(30) Foreign Application Priority Data

Aug. 17, 2022 (CN) ......................... 202210987778.0

(51) Int. Cl.
*E05F 15/76* (2015.01)
*B60L 53/16* (2019.01)

(52) U.S. Cl.
CPC .............. *E05F 15/76* (2015.01); *B60L 53/16* (2019.02); *E05Y 2400/446* (2024.05); *E05Y 2900/534* (2013.01)

(58) Field of Classification Search
CPC . E05F 15/76; E05F 15/73; E05F 15/70; E05F 15/40; B60L 53/16; B60L 1/003; B60L 3/0084; B60L 2240/547; B60L 2240/549; B60L 3/0046; B60L 2240/622; B60L 3/12; B60L 53/11; B60L 53/305;
(Continued)

(56) References Cited

U.S. PATENT DOCUMENTS 11,285,805 B2 * 3/2022 Yagura .................. B60K 15/05
12,586,066 B2 * 3/2026 Achkir ................. G06Q 20/389
(Continued)

FOREIGN PATENT DOCUMENTS

CN 109747523 A 5/2019
CN 111645763 A * 9/2020 .............. B60L 53/16
(Continued)

OTHER PUBLICATIONS

Machine Translation of CN-111645763-A retrieved from Espacenet on Mar. 28, 2026 (Year: 2026).*

*Primary Examiner* — Thomas Ingram
(74) *Attorney, Agent, or Firm* — Conley Rose, P.C.

(57) ABSTRACT

A vehicle control method includes obtaining environment information within a preset range of a charging port cover of the vehicle; recognizing a charging connector based on the environment information; and controlling the charging port cover to open when a distance between the charging connector and the charging port cover is less than or equal to a first threshold such that the charging port cover can automatically open.

20 Claims, 13 Drawing Sheets

(58) Field of Classification Search
CPC ............. B60L 2240/30; B60L 2250/20; B60L 2250/22; B60L 53/37; B60L 58/12; B60L 58/15; B60L 2240/80; B60L 2250/10; B60L 2250/16; B60L 2250/30; E05Y 2400/446; E05Y 2900/435; E05Y 2400/8505; H02J 7/685; H02J 2105/37; Y02T 10/70; Y02T 10/7072; Y02T 90/14
See application file for complete search history.

(56) References Cited

U.S. PATENT DOCUMENTS

| | | | | |
|---|---|---|---|---|
| 2019/0111795 | A1* | 4/2019 | Rhodes | E05F 15/603 |
| 2022/0348097 | A1* | 11/2022 | Garofalo | B60L 53/35 |
| 2024/0109409 | A1* | 4/2024 | Cretin | B60K 15/05 |
| 2025/0170920 | A1* | 5/2025 | Terada | B60L 53/66 |

FOREIGN PATENT DOCUMENTS

| | | | |
|---|---|---|---|
| CN | 111703325 | A | 9/2020 |
| CN | 114183031 | A | 3/2022 |
| CN | 114194046 | A | 3/2022 |

* cited by examiner

VEHICLE CONTROL METHOD AND APPARATUS, AND VEHICLE

CROSS-REFERENCE TO RELATED APPLICATIONS

This is a continuation of International Patent Application No. PCT/CN2023/104647 filed on Jun. 30, 2023, which claims priority to Chinese Patent Application No. 202210987778.0 filed on Aug. 17, 2022, which are hereby incorporated by reference in their entireties.

TECHNICAL FIELD

Embodiments of this disclosure relate to the field of intelligent vehicles, and more further, to a vehicle control method and apparatus, and a vehicle.

BACKGROUND

New energy vehicles such as electric vehicles and plug-in hybrid vehicles are increasingly favored by users. Because such a vehicle needs to be frequently charged in use to ensure a mileage of the vehicle, a charging port cover needs to be controlled to open and close before and after charging. However, a manner of opening and closing the charging port cover is usually a manner in which a user actively presses a switch, for example, presses the charging port cover, presses a physical button of a vehicle key, presses a dedicated button in the vehicle, or presses a virtual button of a vehicle-mounted display. This brings poor user experience.

SUMMARY

Embodiments of this disclosure provide a vehicle control method and apparatus, and a vehicle, to improve charging experience.

According to a first aspect, a vehicle control method is provided. The method includes obtaining environment information around a charging port cover of a vehicle, recognizing a charging connector based on the environment information, and controlling the charging port cover to open when a distance between the charging connector and the charging port cover is less than or equal to a first threshold.

In this embodiment of this disclosure, whether the charging connector is located near the charging port cover may be determined based on the environment information around the charging port cover. Further, a charging intention of a user is recognized based on a relative location relationship between the charging connector and the charging port cover. In other words, it is considered that when the distance between the charging connector and the charging port cover is less than or equal to the first threshold, the user has the charging intention, so that automatic opening of the charging port cover can be implemented. This can improve user experience of vehicle intelligence and improve use experience of the user.

With reference to the first aspect, in some implementations of the first aspect, obtaining environment information around a charging port cover of a vehicle may include obtaining the environment information around the charging port cover of the vehicle when the vehicle is in a parked state.

In this embodiment of this disclosure, when the vehicle is in the parked state, the environment information around the charging port cover is obtained. In one aspect, frequency of obtaining environment data around the charging port cover can be reduced, and overheads of automatic opening of the charging port cover can be reduced. In another aspect, a problem like damage caused by automatic opening of the charging port cover during vehicle driving can be avoided.

With reference to the first aspect, in some implementations of the first aspect, the method further includes controlling a first sensor of the vehicle to be in an enabled state when a distance between a user of the vehicle and the vehicle in the parked state is less than or equal to a second threshold, and the charging port cover of the vehicle is in a closed state, and obtaining environment information around a charging port cover of a vehicle includes obtaining the environment information around the charging port cover of the vehicle through the first sensor.

For example, the first sensor may be one or more sensors, and a sensing area of the sensor may correspond to an installation location of the charging port cover. For example, when the charging port cover is located in a front area of the vehicle, the first sensor may sense environment information around the charging port cover in front of the vehicle. For another example, when the charging port cover is located on a left side of the vehicle, the first sensor may collect environment information near the charging port cover on the left side of the vehicle.

For example, when the first sensor is originally in a disabled state, controlling the first sensor to be in the enabled state may mean to control the sensor to be enabled, and when the first sensor is already in the enabled state, controlling the first sensor to be in the enabled state may mean to control the sensor to remain in the enabled state.

For example, the user of the vehicle may include, for example, a vehicle owner, a holder of a vehicle key (for example, a remote control key or a digital key), an associated user of a logged-in account of the vehicle, or a driver of the vehicle or another member located in a cockpit of the vehicle when the vehicle is in a driving state or before the vehicle is in the parked state. Correspondingly, a user that does not meet the foregoing condition may be referred to as an unauthorized user of the vehicle.

In this embodiment of this disclosure, when the user of the vehicle is close to the vehicle and the charging port cover is closed, the first sensor may be controlled to be in the enabled state, and the charging connector is recognized based on the environment information, collected by the first sensor, around the charging port cover. This can reduce resource overheads of the sensor for obtaining the environment information, and can also reduce invalid information in the environment information used to recognize the charging connector. This can improve accuracy of recognizing the charging connector, and therefore can improve accuracy of enabling an opening function of the charging port cover.

With reference to the first aspect, in some implementations of the first aspect, controlling the charging port cover to open when a distance between the charging connector and the charging port cover is less than or equal to a first threshold may include controlling the charging port cover to open when it is detected that the distance between the charging connector and the charging port cover is less than or equal to the first threshold, and the charging connector moves towards a location of the charging port cover.

In this embodiment of this disclosure, the charging port cover is controlled to open with reference to the distance between the charging connector and the charging port cover and a motion status of the charging connector. This can reduce a probability of opening the charging port cover by mistake, and can improve user experience.

With reference to the first aspect, in some implementations of the first aspect, the method may further include obtaining a first location and a second location when the charging connector is recognized, where the first location is a location of the charging connector at a first moment, the second location is a location of the charging connector at a second moment, and the first moment is earlier than the second moment, and controlling the charging port cover to open when it is detected that the distance between the charging connector and the charging port cover is less than or equal to the first threshold, and the charging connector moves towards a location of the charging port cover includes controlling the charging port cover to open when it is determined that a distance between the second location and the charging port cover is less than or equal to the first threshold, and the distance between the second location and the charging port cover is less than a distance between the first location and the charging port cover.

For example, a camera included in the first sensor may also be referred to as a first camera, to distinguish from another camera sensor in the vehicle. The first camera may be configured to collect the environment information around the charging port cover. A location of the first camera may correspond to a location of the charging port cover.

For example, the first moment may be any moment, and the second moment may be any moment later than the first moment. Therefore, a change of the location of the charging connector relative to the charging port cover may be determined based on locations of the charging connector at the two moments, to determine the charging intention of the user.

For example, the first location and the second location may be determined based on image information collected by one or more camera sensors, or the first location and the second location may be determined based on information collected by a radar sensor.

In this embodiment of this disclosure, locations of the charging connector at different moments are determined, and a relative location relationship and change between the charging connector and the charging port cover are determined accordingly, so that complexity of determining displacement information of the charging connector can be reduced, and resource overheads can be reduced.

With reference to the first aspect, in some implementations of the first aspect, the method may further include obtaining characteristic information of the charging connector, and controlling the charging port cover to open includes controlling the charging port cover to open when it is determined, based on the characteristic information, that the charging connector adapts to the charging port cover.

For example, the charging connector may be a charging connector of a home charging pile, or may be a charging connector in a public place like a shopping mall or a parking lot. In different scenarios, the charging connector configured to charge the vehicle may have different forms. The characteristic information of the charging connector may be a contour, a shape, and a color of the charging connector, a shape and a type of a charging port, or the like. For example, a charging pile and a charging connector that match a vehicle brand and a vehicle model may have a specific shape, color, and the like. Whether the charging connector matches the charging port cover may be determined by obtaining the characteristic information like the shape and color of the charging connector. For another example, when the vehicle includes a plurality of different types of charging ports, and the plurality of charging ports is blocked by using a plurality of charging port covers, the characteristic information may include a shape, a type, and the like of the charging port. In this way, whether the charging connector adapts to the charging port can be determined, to prevent the charging port cover from being opened by mistake.

In this embodiment of this disclosure, when the obtained characteristic information of the charging connector includes a matching characteristic, the charging port cover is controlled to open. This can reduce a probability of opening the charging port cover by mistake, and can improve user experience of an intelligent function of the vehicle.

With reference to the first aspect, in some implementations of the first aspect, controlling the charging port cover to open when a distance between the charging connector and the charging port cover is less than or equal to a first threshold may include controlling the charging port cover to open when the charging connector is held by the user of the vehicle, and the distance between the charging connector and the charging port cover is less than or equal to the first threshold.

For example, before the charging port cover is controlled to open, identity information of a holder of the charging connector may be verified. For example, when it is determined that the holder of the charging connector is an owner of the vehicle, and before the vehicle is in the parked state, the user is a person located in the cockpit of the vehicle, the charging port cover may be controlled to open.

In an actual scenario, there may be another user or another vehicle in an environment in which the vehicle is located. In this embodiment of this disclosure, when an identity of the charging connector holder is determined, and the charging connector holder is the user of the vehicle, the charging port cover is automatically started. In a scenario in which there is another vehicle or user, a probability of opening the charging port cover by mistake can be reduced, and the other user can be prevented from performing an unfriendly behavior on the charging port. This can improve safety performance of the vehicle.

With reference to the first aspect, in some implementations of the first aspect, controlling the charging port cover to open when a distance between the charging connector and the charging port cover is less than or equal to a first threshold may include controlling the charging port cover to open when the distance between the user of the vehicle and the vehicle is less than or equal to a preset threshold, when it is detected that the distance between the charging connector and the charging port cover is less than or equal to the first threshold, and when the charging connector is held by an authorized user of the vehicle.

In an actual charging scenario, the charging connector may be held by another person (for example, a service person in a public place). When the charging connector is held by the authorized user of the vehicle, and the distance between the user of the vehicle and the vehicle is less than or equal to the preset threshold, it may be considered that the vehicle is in a safe charging scenario. When the distance between the user of the vehicle and the vehicle is greater than the preset threshold, and the charging connector is held by an unauthorized user of the vehicle, it may be considered that the vehicle is not in a safe charging scenario, and therefore the charging port cover may not be controlled to open.

In this embodiment of this disclosure, when the charging connector is held by the authorized user, and the vehicle is in the safe charging scenario, the charging port cover is controlled to open, to help ensure charging safety of the vehicle.

With reference to the first aspect, in some implementations of the first aspect, the method may further include sending a first message when the charging connector charges the vehicle, and remaining power of the vehicle is greater than or equal to a third threshold, where the first message indicates the remaining power of the vehicle.

For example, the third threshold may be 90%, 95%, or the like, or may be another value.

In this embodiment of this disclosure, when the vehicle is charged by using the charging connector and battery power of the vehicle is greater than or equal to the third threshold, the first message is sent to prompt the user to remove the charging connector timely, so that damage to a vehicle battery caused by overcharging can be avoided, and another safety accident caused by overcharging can be avoided.

With reference to the first aspect, in some implementations of the first aspect, the method may further include obtaining a first charging parameter of the charging connector, and when the first charging parameter does not match a second charging parameter of the vehicle, informing the user that there is an exception in a charging process.

For example, the first charging parameter may be a charging configuration parameter, for example, a configuration parameter like a charging voltage and a charging current, configured by the charging pile for the vehicle by using the charging connector. The second charging parameter may be a charging requirement parameter, for example, information related to a charging requirement like a current required for charging and a voltage required for charging, determined by the vehicle or a battery management system.

For example, when the first charging parameter is partially or completely missing, it may be considered that the first charging parameter does not match the second charging parameter, and it may be considered that there is an exception in the charging process.

For example, the first charging parameter may be obtained in a wired or wireless manner. For example, when the charging pile or the charging connector may exchange information with the vehicle in a wireless communication manner like Bluetooth, the vehicle may receive a charging configuration parameter from the charging connector or the charging pile. For another example, when the charging connector is connected to a charging port of the vehicle, the charging connector may exchange information with the vehicle through a communication interface, and the vehicle may obtain the charging configuration parameter configured by the charging pile for the vehicle. Further, when an apparatus like an automotive chip, a vehicle-mounted apparatus (for example, a controller or a domain controller), or a head unit system implements the method, the charging configuration parameter may be obtained through an internal circuit of the vehicle, and the charging requirement parameter of the vehicle may be further obtained.

With reference to the first aspect, in some implementations of the first aspect, the method may further include controlling the charging port cover to close when the charging port cover is in an open state, and when it is detected that the user removes the charging connector from a charging port of the vehicle.

In this embodiment of this disclosure, when it is detected that the charging connector is removed from the charging port cover, the charging port cover is controlled to close. This can implement automatic control of the charging port cover in an entire charging process, and therefore can improve user experience.

With reference to the first aspect, in some implementations of the first aspect, the method may further include obtaining a distance between a first human body part and the charging port cover, and controlling the charging port cover to close when the charging port cover is in an open state, and when it is detected that the user removes the charging connector from a charging port of the vehicle includes controlling the charging port cover to close when the charging port cover is in the open state, when it is detected that the user removes the charging connector from the charging port of the vehicle, and when the distance between the first human body part and the charging port cover is greater than or equal to a fourth threshold.

For example, when the distance between the human body part (for example, a hand, an arm, or a head) and the charging port cover is greater than or equal to a safety threshold (for example, 30 centimeters or 40 centimeters), it may be determined that the distance between the human body part and the charging port cover is greater than or equal to the fourth threshold. Alternatively, when it is determined that the human body part is outside a preset range of the charging port cover, it may be determined that the distance between the human body part and the charging port cover is greater than or equal to the fourth threshold.

In this embodiment of this disclosure, when the distance between the human body part and the charging port cover is greater than or equal to the fourth threshold, the charging port cover is controlled to close. This can prevent a user from being injured in a process in which the charging port cover closes, and ensure personal safety of the user.

With reference to the first aspect, in some implementations of the first aspect, the method may further include obtaining a quantity of failure times when an operation of closing the charging port cover fails, and when the quantity of failure times is greater than or equal to a fifth threshold, interrupting performing the operation of closing the charging port cover, and informing the user that the charging port cover fails to close, and indicating to check the charging port cover.

For example, controlling the charging port cover to open or close may be controlling the charging port cover to open or close by using an execution mechanism. For example, the execution mechanism may include a motor that controls movement of the charging port cover, and the like.

In this embodiment of this disclosure, when an operation of closing the charging port cover fails, whether to suspend a function that the charging port cover automatically closes is determined based on the quantity of failure times. After the function is suspended, the user may be informed. Therefore, when there is an obstacle like a dried branch or a small rock, damage to the charging port cover, the execution mechanism, and the like caused by a plurality of attempts to perform the operation of the charging port cover can be avoided, and the user may be prompted to pay attention to the charging port to clean the obstacle and close the charging port.

With reference to the first aspect, in some implementations of the first aspect, the method may further include informing the user that the charging port cover is to close when the charging port cover is controlled to close.

With reference to the first aspect, in some implementations of the first aspect, the method may further include informing the user that the charging port cover is to open when the charging port cover is controlled to open.

With reference to the first aspect, in some implementations of the first aspect, the method may further include obtaining data collected by a second sensor, and determining the distance between the user of the vehicle and the vehicle based on the data collected by the second sensor, where a sensing range of the second sensor is different from a sensing range of the first sensor, and controlling a first sensor to be in an enabled state when a distance between a user of the vehicle and the vehicle is less than or equal to a second threshold, and the charging port cover is in a closed state may include, when the distance between the user of the vehicle and the vehicle is less than or equal to the second threshold, and the charging port cover is in the closed state, controlling the first sensor to be in the enabled state, and disabling the second sensor.

In this embodiment of this disclosure, a process in which the user holds the charging connector and approaches the vehicle can be split based on the distance between the user and the vehicle, so that functions of different sensors in different phases of the process can be refined. The enabled state and the disabled state of the sensor are controlled based on the different phases of the process, so that total sensor power consumption can be reduced. An endurance mileage of an intelligent vehicle or a new energy vehicle can be improved.

According to a second aspect, a vehicle control apparatus is provided. The apparatus may include an obtaining unit configured to obtain environment information around a charging port cover of a vehicle, and a processing unit configured to recognize a charging connector based on the environment information, and control the charging port cover to open when a distance between the charging connector and the charging port cover is less than or equal to a first threshold.

With reference to the second aspect, in some implementations of the second aspect, the obtaining unit may be configured to obtain the environment information around the charging port cover of the vehicle when the vehicle is in a parked state.

With reference to the second aspect, in some implementations of the second aspect, the processing unit may be further configured to control a first sensor of the vehicle to be in an enabled state when a distance between a user of the vehicle and the vehicle is less than or equal to a second threshold, and the charging port cover of the vehicle is in a closed state, and the obtaining unit is configured to obtain the environment information around the charging port cover of the vehicle through the first sensor.

With reference to the second aspect, in some implementations of the second aspect, the processing unit may be configured to control the charging port cover to open when it is detected that the distance between the charging connector and the charging port cover is less than or equal to the first threshold, and the charging connector moves towards a location of the charging port cover.

With reference to the second aspect, in some implementations of the second aspect, the obtaining unit may be further configured to obtain a first location and a second location when the charging connector is recognized, where the first location is a location of the charging connector at a first moment, the second location is a location of the charging connector at a second moment, and the first moment is earlier than the second moment, and the processing unit is configured to control the charging port cover to open when it is determined that a distance between the second location and the charging port cover is less than or equal to the first threshold, and the distance between the second location and the charging port cover is less than a distance between the first location and the charging port cover.

With reference to the second aspect, in some implementations of the second aspect, the obtaining unit may be further configured to obtain characteristic information of the charging connector, and the processing unit may be further configured to control the charging port cover to open when it is determined, based on the characteristic information, that the charging connector adapts to the charging port cover.

With reference to the second aspect, in some implementations of the second aspect, the processing unit may be configured to control the charging port cover to open when the user of the vehicle holds the charging connector, and the distance between the charging connector and the charging port cover is less than or equal to the first threshold.

With reference to the second aspect, in some implementations of the second aspect, the processing unit may be configured to control the charging port cover to open when the distance between the user of the vehicle and the vehicle is less than or equal to a preset threshold, when it is detected that the distance between the charging connector and the charging port cover is less than or equal to the first threshold, and when the charging connector is held by an authorized user of the vehicle.

With reference to the second aspect, in some implementations of the second aspect, the apparatus may further include a sending unit, and the sending unit may be configured to send a first message when the charging connector charges the vehicle, and remaining power of the vehicle is greater than or equal to a third threshold, where the first message indicates the remaining power of the vehicle.

With reference to the second aspect, in some implementations of the second aspect, the obtaining unit may be further configured to obtain a first charging parameter of the charging connector, and the processing unit may be further configured to, when the first charging parameter does not match a second charging parameter of the vehicle, inform the user that there is an exception in a charging process.

With reference to the second aspect, in some implementations of the second aspect, the processing unit may be further configured to control the charging port cover to close when the charging port cover is in an open state, and when it is detected that the user removes the charging connector from a charging port of the vehicle.

With reference to the second aspect, in some implementations of the second aspect, the obtaining unit may be further configured to obtain a distance between a first human body part and the charging port cover, and the processing unit may be configured to control the charging port cover to close when the charging port cover is in the open state, when it is detected that the user removes the charging connector from the charging port of the vehicle, and when the distance between the first human body part and the charging port cover is greater than or equal to a fourth threshold.

With reference to the second aspect, in some implementations of the second aspect, the obtaining unit may be further configured to obtain a quantity of failure times when an operation of closing the charging port cover fails, and the processing unit may be further configured to, when the quantity of failure times is greater than or equal to a fifth threshold, interrupt performing the operation of closing the charging port cover, and inform the user that the charging port cover fails to close, and indicate to check the charging port cover.

With reference to the second aspect, in some implementations of the second aspect, the processing unit may be further configured to inform the user that the charging port cover is to close when the charging port cover is controlled to close.

With reference to the second aspect, in some implementations of the second aspect, the processing unit may be further configured to inform the user that the charging port cover is to open when the charging port cover is controlled to open.

With reference to the second aspect, in some implementations of the second aspect, the obtaining unit may be further configured to obtain data collected by a second sensor, where a sensing range of the second sensor is different from a sensing range of the first sensor, and the processing unit may be configured to determine the distance between the user of the vehicle and the vehicle based on the data collected by the second sensor, and when the distance between the user of the vehicle and the vehicle is less than or equal to the second threshold, and the charging port cover is in the closed state, control the first sensor to be in the enabled state, and disable the second sensor.

According to a third aspect, an apparatus is provided. The apparatus may include a processor and a memory. The memory is configured to store program instructions, and the processor is configured to invoke the program instructions to perform the method in any one of the first aspect or the possible implementations of the first aspect.

According to a fourth aspect, a transport means is provided, where the transport mean includes the apparatus according to the second aspect or the third aspect.

With reference to the fourth aspect, in some implementations of the fourth aspect, the transport means is a vehicle.

According to a fifth aspect, a computer program product is provided. The computer program product includes computer program code, and when the computer program code is run on a computer, the computer is enabled to perform any possible method in the first aspect.

It should be noted that all or some of the computer program code may be stored in a first storage medium. The first storage medium may be encapsulated together with a processor, or may be encapsulated separately from a processor. This is not limited in embodiments of this disclosure.

According to a sixth aspect, a computer-readable medium is provided. The computer-readable medium stores program code. When the computer program code is run on a computer, the computer is enabled to perform any possible method in the first aspect.

According to a seventh aspect, an embodiment of this disclosure provides a chip system. The chip system includes a processor configured to invoke a computer program or computer instructions stored in a memory, so that the processor is enabled to perform any possible method in the first aspect.

With reference to the seventh aspect, in a possible implementation, the processor is coupled to a memory through an interface.

With reference to the seventh aspect, in a possible implementation, the chip system further includes a memory. The memory stores a computer program or computer instructions.

According to an eighth aspect, a computer program product including instructions is provided, where the computer program product includes computer program code, and when the computer program code is run on a computer, the computer is enabled to perform the method in any one of the first aspect or the possible implementations of the first aspect.

Embodiments of this disclosure provide a vehicle control method, so that a charging connector can be recognized based on environment information around a charging port cover, and whether a user has a charging intention can be determined based on a distance between the charging connector and the charging port cover. This implements automatic opening of the charging port cover, and improves user experience. Further, a parking status of a vehicle is determined, so that frequency of obtaining the environment data around the charging port cover can be reduced, overheads can be reduced, and a case in which the charging port cover is damaged because of automatic opening of the charging port cover during vehicle driving can be avoided. When a distance between a user of the vehicle and the vehicle is within a second threshold and the charging port cover is closed, the environment information around the charging port cover is obtained, so that interference caused by invalid information to recognizing the charging connector can be reduced, to improve accuracy of recognizing the charging connector. A relative location relationship and change between the charging connector and the charging port cover are determined by using a first location and a second location. This can reduce complexity of determining whether the charging connector moves towards a location of the charging port cover, and can reduce resource overheads. Characteristic information of the charging connector is determined, so that a probability of opening the charging port cover by mistake can be reduced, and user experience of an intelligent function of the vehicle can be improved. Whether the vehicle is in a safe charging scenario is determined based on an identity of a holder of the charging connector, so that safety performance of the vehicle can be improved. When charging power is greater than or equal to a third threshold, first information can be sent to prompt the user to process the charging connector, to avoid adverse impact caused by overcharging on a battery of the vehicle, vehicle safety, and the like. The user can be prompted when charging configuration of the charging pile and the charging connector does not match a charging requirement of the vehicle, so that the user can learn whether a charging expectation can be achieved in a charging process of the charging connector. When it is detected that the charging connector is removed from the charging port, the charging port cover can be controlled to close, so that the charging port cover can automatically close. In this way, the charging port cover can automatically open and close in an entire charging scenario, and user experience can be improved. When it is determined that a distance between a human body part and the charging port cover is greater than or equal to a fourth threshold, the charging port cover can be controlled to close, to prevent a user from being injured in a process in which the charging port cover closes, and ensure personal safety of the user. When an operation of closing the charging port cover fails, whether to suspend a function that the charging port cover automatically closes can be determined based on a quantity of failure times, and the user may be informed. Therefore, when there is an obstacle like a dried branch or a small rock, damage to the charging port cover, the execution mechanism, and the like caused by a plurality of attempts to perform the operation of the charging port cover can be avoided, and the user may be prompted to pay attention to the charging port to clean the obstacle and close the charging port. When the charging port cover is controlled to open or close, the user can be prompted to stay away from a movement area of the charging port cover, to ensure normal running of the apparatus, and help protect personal safety of the user. In a process in which the user holds the charging connector to approach to the vehicle, functions of different sensors in different phases in the process can be refined based on the distance between the user and the vehicle. Therefore, power consumption of the sensors can be reduced by controlling statuses of a first sensor and a second sensor in different phases. An endurance mileage of an intelligent vehicle or a new energy vehicle can be improved.

DESCRIPTION OF EMBODIMENTS

The following describes technical solutions of embodiments in this disclosure with reference to accompanying drawings.

Figure 1:
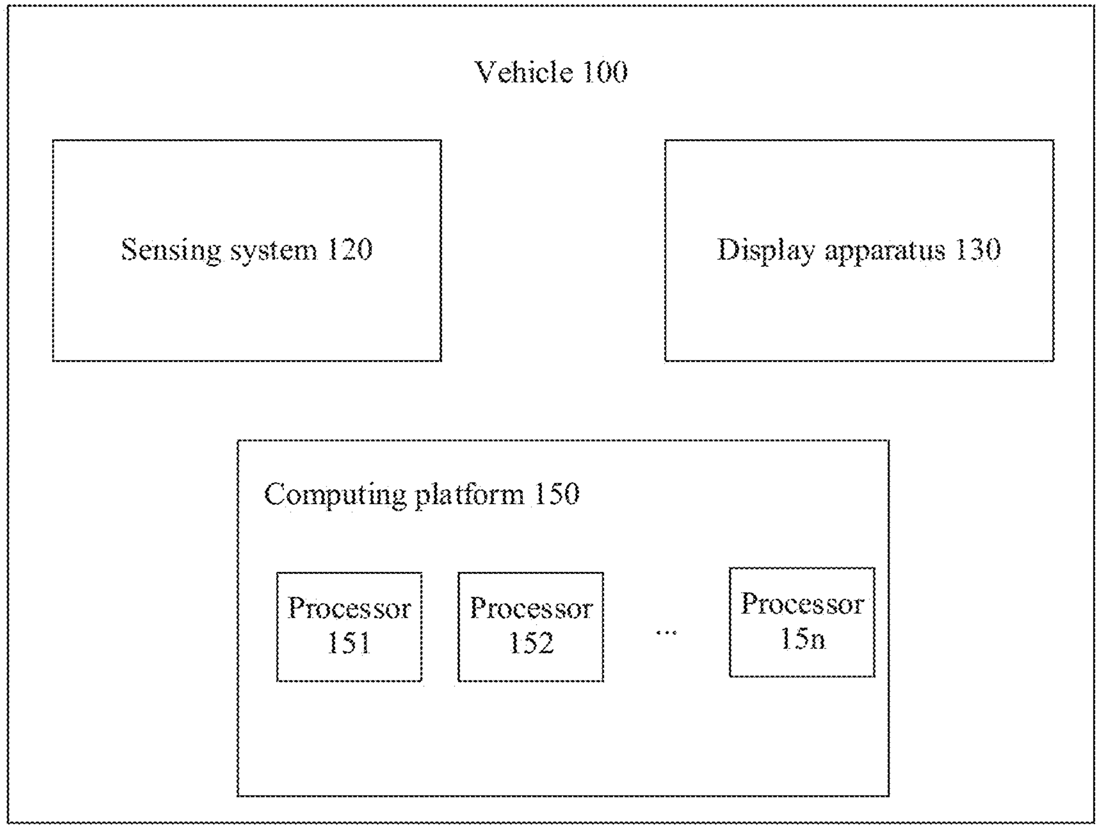
FIG. 1 is a schematic functional block diagram of a vehicle according to an embodiment of this disclosure.

FIG. 1 is a schematic functional block diagram of a vehicle 100 according to an embodiment of this disclosure. The vehicle 100 may include a sensing system 120, a display apparatus 130, and a computing platform 150. The sensing system 120 may include one or more sensors that sense information about an environment around the vehicle 100. For example, the sensing system 120 may include a positioning system. The positioning system may be a Global Positioning System (GPS), or may be one or more of a BEIDOU system or another positioning system, an inertial measurement unit (IMU), a lidar, a millimeter-wave radar, an ultrasonic radar, or a camera apparatus.

Some or all functions of the vehicle 100 may be controlled by the computing platform 150. The computing platform 150 may include one or more processors, for example, a processor 151 to a processor 15*n* (n is a positive integer). The processor is a circuit having a signal processing capability. In an implementation, the processor may be a circuit having an instruction reading and running capability, for example, a central processing unit (CPU), a microprocessor, a graphics processing unit (GPU) (which may be understood as a microprocessor), or a digital signal processor (DSP). In another implementation, the processor may implement a specific function by using a logical relationship of a hardware circuit. The logical relationship of the hardware circuit is fixed or reconfigurable. For example, the processor is a hardware circuit implemented by an application-specific integrated circuit (ASIC) or a programmable logic device (PLD), for example, a field-programmable gate array (FPGA). In a reconfigurable hardware circuit, a process in which the processor loads a configuration file to implement hardware circuit configuration may be understood as a process in which the processor loads instructions to implement functions of some or all of the foregoing units. In addition, the circuit may be a hardware circuit designed for artificial intelligence, and may be understood as an ASIC, for example, a neural network processing unit (NPU), a tensor processing unit (TPU), or a deep learning processing unit (DPU). In addition, the computing platform 150 may further include a memory. The memory is configured to store instructions, and some or all of the processor 151 to the processor 15*n* may invoke the instructions in the memory to execute the instructions, to implement a corresponding function.

When a vehicle that needs to be charged, like an electric vehicle or a plug-in hybrid vehicle, is used, due to a limitation of a battery capacity, the vehicle needs to be frequently charged to maintain a mileage of the vehicle. For example, when battery power is insufficient, the vehicle needs to be stopped at a parking space near a charging pile, and the vehicle is charged by a charging connector of the charging pile. Before and after charging, a user needs to press a switch to open and close a charging port cover.

In this embodiment of this disclosure, a charging intention of the user can be recognized based on a relative location relationship between the charging connector and the charging port cover, and when it is determined that the user has a charging intention, the charging port cover can automatically open. This can improve user experience of vehicle intelligence and improve use experience of the user.

For example, FIG. 2A, FIG. 2B, FIG. 2C, and FIG. 2D are schematic diagrams of a charging connector according to an embodiment of this disclosure. One end of a charging connector cable 210 may be connected to a charging connector 200, and the other end of the charging connector cable 210 may be connected to a power supply (not shown in FIGS. 2A-2D), for example, a charging pile or a mobile charging apparatus (for example, a mobile charging vehicle). The charging connector 200 may be connected to a charging port of a vehicle through a charging connector port 220. When the charging connector 200 is connected to the vehicle through the charging connector port 220, the charging connector cable 210 may be configured to transmit electric energy.

Figure 2A:
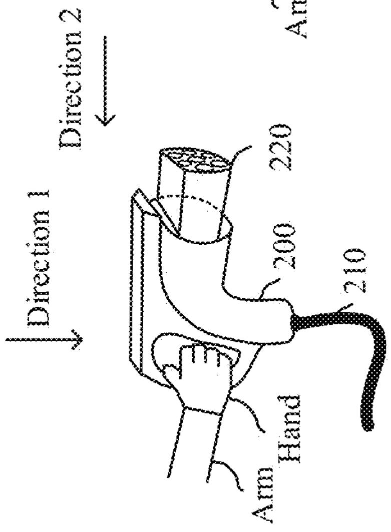
FIG. 2A, FIG. 2B, FIG. 2C, and FIG. 2D are schematic diagrams of a charging connector according to an embodiment of this disclosure.
Figure 2B:
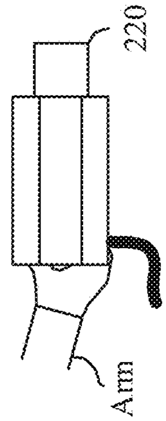
Figure 2C:
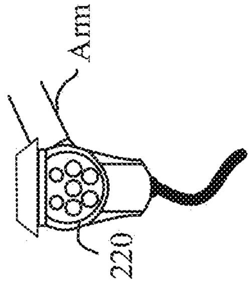
Figure 2D:
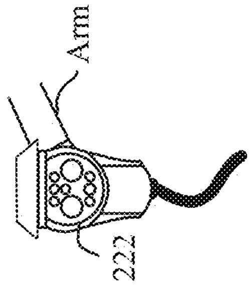

As shown in FIG. 2A, for example, a user may connect the charging connector 200 to the charging port of the vehicle in a handheld manner, or remove the charging connector from the charging port of the vehicle, to disconnect the charging connector 200 from the charging port of the vehicle. For example, as shown in FIG. 2A, when the charging connector 200 is projected in a direction 1 and an image of the charging connector is collected, an image shown in FIG. 2B may be obtained, and when the charging connector 200 is projected in a direction 2 and an image of the charging connector is collected, an image shown in FIG. 2C may be obtained, where the direction 1 may be a vertical direction, the direction 2 may be a horizontal direction, and the direction 1 and the direction 2 may alternatively be other directions.

For example, charging connectors of different models may have different characteristics. For example, shapes, contours, and characteristic sizes may be different. For another example, a charging connector shown in FIG. 2D may be a view of another model of charging connector in the direction 2, and a port 222 of the charging connector may have a different shape, structure, size, and the like from the port 220. It should be understood that the foregoing description of the charging connector is only an example, and this is not limited in embodiments of this disclosure.

Figure 3:
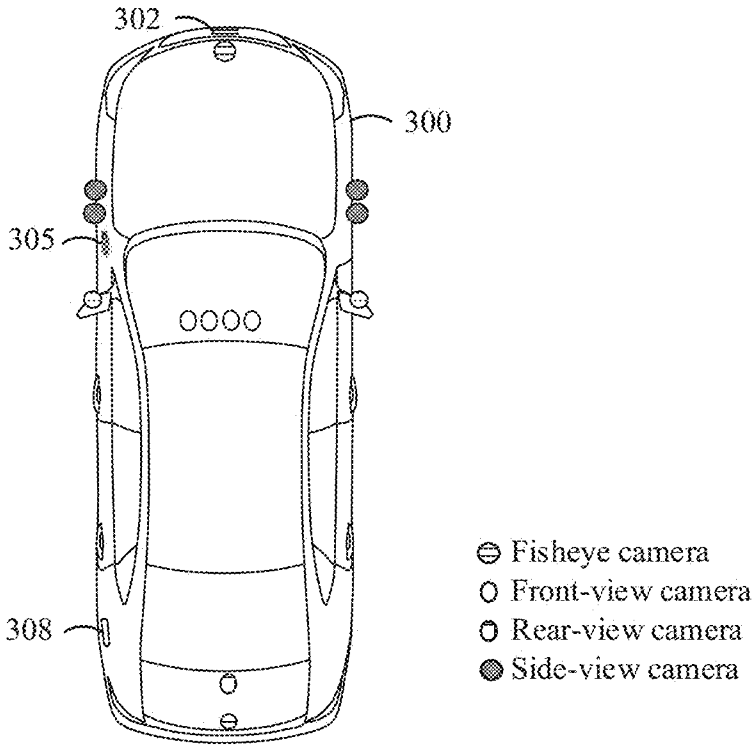
FIG. 3 is a schematic diagram of a vehicle sensor, a charging port, and locations of the vehicle sensor and the charging port according to an embodiment of this disclosure.

For example, FIG. 3 is a schematic diagram of a vehicle sensor, a charging port, and locations of the vehicle sensor and the charging port according to an embodiment of this disclosure.

For example, a vehicle may include a plurality of sensors, for example, a radar sensor and a camera sensor. The radar sensor may be a type of a radar like a lidar, a millimeter-wave radar, or an ultrasonic radar, and the camera sensor may be a front-view camera, a rear-view camera, a side-view camera, a fisheye camera, or the like. FIG. 3 shows some common camera sensor types and installation locations. However, types, a quantity, and locations of vehicle sensors are not limited in embodiments of this disclosure.

For example, a vehicle may include a plurality of types of cameras, for example, a long-focus camera, a wide-angle camera, a dual-lens camera, and a fisheye camera. For example, as shown in FIG. 3, a front-view camera may include a camera of a type like a long-focus camera, a wide-angle camera, or a dual-lens camera.

For example, the vehicle may also include a plurality of types of radar sensors, for example, an ultrasonic radar, a millimeter-wave radar, and a lidar.

For example, for a rechargeable vehicle, a charging port and a charging port cover may be disposed on the vehicle. When the charging port cover is in a closed state, the charging port may be blocked by the charging port cover, so that the charging port cover can protect the charging port of the vehicle from being affected by foreign matters such as a small rock and dust. When the charging port cover is in an open state, the charging port is connected to a charging connector, to charge the vehicle. FIG. 3 further shows locations of charging ports of some common vehicles. For example, as shown in FIG. 3, the charging port may be located in front of the vehicle, and an installation location of the charging port cover of the charging port may be shown as a charging port cover 302. The charging port may be located on either side of the vehicle. For example, when the charging port is located on a front fender, an installation location of the charging port cover of the charging port may be shown as a charging port cover 305. When the charging port is located on a rear fender, an installation location of the charging port cover of the charging port may be shown as a charging port cover 308. For another example, some vehicles may include a plurality of charging ports. The plurality of charging ports may be of different types, for example, a direct current charging port and an alternating current charging port (or separately referred to as a fast charging port and a slow charging port). The plurality of charging ports may be disposed at close locations, and may be blocked by a same charging port cover, or may be separately disposed. For example, the fast charging port and the slow charging port may be respectively disposed on a left side and a right side of a vehicle body, and blocked by different charging port covers.

In some possible implementations, the vehicle may learn whether the charging port is connected to the charging connector. For example, a current, a voltage, and the like of the charging port is detected. This can determine whether the vehicle is in a charging state, and can determine whether the charging port is connected to the charging connector. It should be understood that, for a method for determining whether the charging connector is connected, refer to other approaches.

Figure 4:
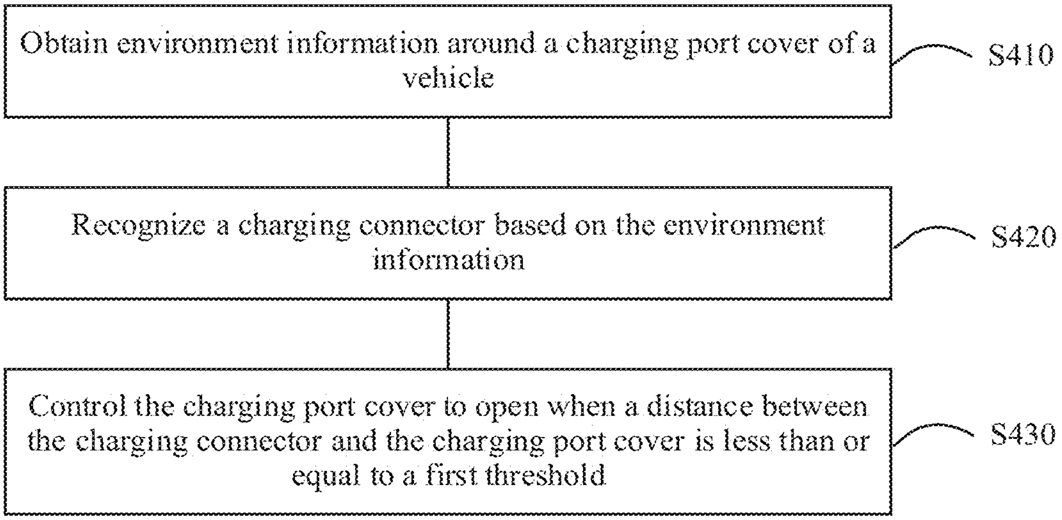
FIG. 4 is a schematic flowchart of a control method according to an embodiment of this disclosure.

For example, FIG. 4 is a schematic flowchart of a vehicle control method according to an embodiment of this disclosure. The method 400 may be performed by a vehicle, or may be performed by the foregoing computing platform. Alternatively, the method may be performed by the one or more processors in the foregoing computing platform. Alternatively, the method may be performed by a head unit system or another vehicle-mounted terminal. Alternatively, the method may be performed by a chip in the head unit system or the other vehicle-mounted terminal. The method may include the following steps:

S410: Obtain environment information around a charging port cover of a vehicle.

For example, image information, collected by one or more camera sensors, around the charging port cover may be obtained, so that an environment around the charging port cover may be learned. For example, when the charging port cover is located in front of the vehicle, for example, at a location of 302 in FIG. 3, the environment information around the charging port cover may be obtained through a sensor like a front-view camera of the vehicle or a fisheye camera at a front end of the vehicle. For another example, when the charging port cover is located on a side of the vehicle, for example, at a location shown of 308 in FIG. 3, the environment information around the charging port cover may be obtained through a sensor like a side-view camera on a left side of the vehicle or a fisheye camera on the left side of the vehicle. Certainly, the charging port cover may be located at another location.

For example, before the environment information around the charging port cover is obtained, whether the vehicle is in a pre-charging scenario may be determined. For example, whether the vehicle is in a parked state may be determined. When the vehicle is in the parked state, it is considered that the vehicle is in the pre-charging scenario. For another example, a distance between a user of the vehicle and the vehicle may be determined as a charging connector may need to be held by the user. When it is determined that the distance between the user of the vehicle and the vehicle is less than or equal to a second threshold, it may be considered that the vehicle is in the pre-charging scenario. For another example, when the charging port cover is in an open state, the charging port cover does not need to be controlled to open again. Before the environment information around the charging port cover is obtained, it may be determined that the charging port cover is in a closed state. For another example, the foregoing examples may be combined with each other. For example, when the charging port cover is in the closed state and the distance between the user of the vehicle and the vehicle is less than or equal to the second threshold, the sensor may be controlled to be in an enabled state, to obtain the environment information around the charging port cover.

In this embodiment of this disclosure, when it is determined that the vehicle is in the pre-charging scenario, the environment information around the charging port cover is obtained, so that resource overheads for obtaining the environment information when the vehicle is not in the pre-charging scenario can be reduced. Because the environment information around the charging port cover is used to recognize the charging connector, invalid information in the environment information can also be reduced, to improve accuracy of recognizing the charging connector.

For example, a first sensor is controlled to be in an enabled state when the distance between the user of the vehicle and the vehicle is less than or equal to the second threshold, and the charging port cover of the vehicle is in the closed state, and obtaining the environment information around the charging port cover may include obtaining the environment information around the charging port cover of the vehicle through the first sensor.

For example, the first sensor may be configured to sense environment information in a preset range around the charging port cover, and may be a sensor corresponding to an installation location of the charging port cover. Controlling the first sensor to be in the enabled state may be controlling the sensor to be enabled when the sensor is originally in a disabled state, or may be controlling the sensor to remain in the enabled state when the sensor is already in the enabled state, so that data obtained by the sensor may be obtained, or may be controlling a plurality of sensors including the first sensor to be in the enabled state. For example, the preset range may be a part or the entire sensing range of the first sensor.

In some possible implementations, it is determined, based on surrounding environment data collected by the sensor of the vehicle, that the distance between the user and the vehicle is less than or equal to the second threshold. For example, when the user pulls up a hand brake, opens a vehicle door, or the like, a surround view system of the vehicle may be in an enabled state, and whether the user is in a preset range around the vehicle may be determined based on data collected by the surround view system of the vehicle. When the user is in the preset range, it may be considered that the distance between the user and the vehicle is less than or equal to the second threshold. For another example, whether the distance between the user and the vehicle is less than or equal to the second threshold may be determined based on data collected by an ultrasonic radar, a millimeter-wave radar, or the like around the vehicle. For another example, when it is determined that the vehicle is in the parked state, and when it is detected that the user opens a vehicle door from a cockpit, it may be considered that the distance between the user and the vehicle is less than or equal to the second threshold. For another example, the second threshold may be 1 meter, 1.2 meters, or the like.

For example, the user of the vehicle may include, for example, a vehicle owner, a holder of a vehicle key, an associated user of a logged-in account of the vehicle, or a driver of the vehicle when the vehicle is in a driving state or before the vehicle is in the parked state.

In this embodiment of this disclosure, when the user of the vehicle is close to the vehicle and the charging port cover is closed, it can be determined that the vehicle is in a safe charging environment. The first sensor is controlled to be in the enabled state for obtaining the environment information around the charging port cover, so that resource overheads of the sensor for obtaining the environment information can be reduced, and working duration of the sensor can be reduced, to prolong a service life of the sensor. In another aspect, invalid data in data collected by the sensor can be reduced, to improve accuracy of recognizing the charging connector.

S420: Recognize the charging connector based on the environment information.

For example, the environment information around the charging port cover may be determined based on the data collected by the first sensor, to recognize the charging connector. For example, an apparatus like a chip or a head unit system may directly obtain, from a camera sensor, a radar sensor, or the like, data, collected by the apparatus, of a surrounding environment of the charging port cover, to determine the surrounding environment of the charging port cover, or may obtain, from another apparatus, the data collected by the sensor, to determine the surrounding environment of the charging port cover, or may obtain data obtained after data processing such as filtering and feature extraction on the data collected by the sensor, to determine the surrounding environment of the charging port cover. For another example, the charging connector may be recognized through a neural network, database matching, or the like based on the data collected by the first sensor.

In this embodiment of this disclosure, when it is determined that the vehicle is in the pre-charging scenario, the first sensor is controlled to be in the enabled state, to obtain environment information used to recognize the charging connector. Whether there is a charging connector around the charging port cover can be preliminarily determined with small sensor power consumption. For an intelligent vehicle or a new energy vehicle, this helps increase an endurance mileage of the vehicle, and can also reduce invalid information in a process of recognizing the charging connector.

S430: Control the charging port cover to open when it is detected that a distance between the charging connector and the charging port cover is less than or equal to a first threshold.

For example, the first threshold may be an actual length threshold (for example, 0.8 meter or 1 meter), or may be a threshold of a distance in a direction (for example, a threshold of a distance in a vertical axis direction or a horizontal axis direction of the vehicle, for example, 0.5 meter or 0.6 meter), or may be a threshold of a distance represented by an image pixel, or may be a threshold of a distance in a preset coordinate system. The preset coordinate system may be set based on a vehicle posture. Alternatively, a location of the charging connector may be set based on a posture of a sensor that obtains the location of the charging connector, or may be set in another manner. This is not limited in this embodiment of this disclosure.

For example, when the charging connector is recognized, a location of the charging connector at one or more moments may be obtained. For example, because the vehicle is in a parked state, and locations of the charging port, the charging port cover, and the sensor on the vehicle are fixed, a distance between the charging port cover and the charging connector may be determined by obtaining location information of the charging connector, and a movement direction of the charging connector relative to the charging port cover may be determined based on the location information of the charging connector.

Figure 5A:
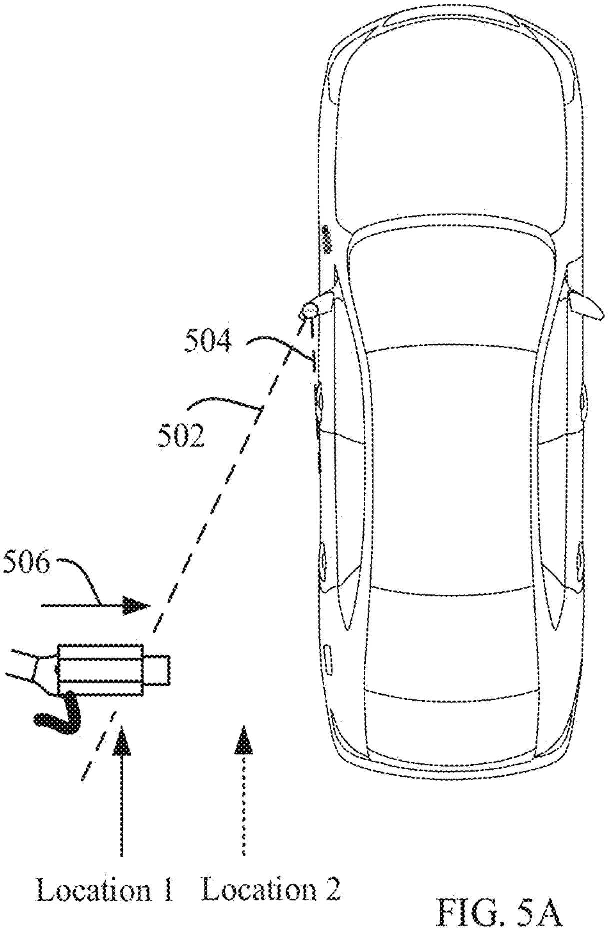
FIG. 5A, FIG. 5B, and FIG. 5C are schematic diagrams of a charging scenario according to an embodiment of this disclosure.
Figure 5B:
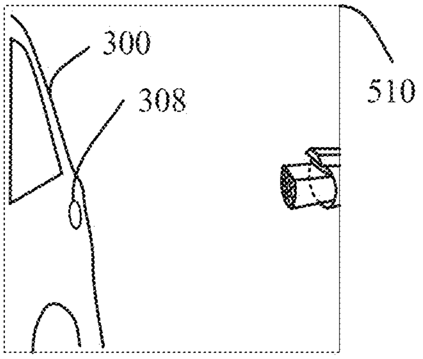
Figure 5C:
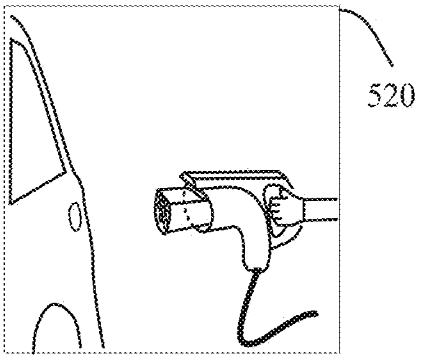

For example, FIGS. 5A-5C is a schematic diagram of a charging scenario according to an embodiment of this disclosure. As shown in FIG. 5A, an example in which an installation location of a charging port cover is at a charging port cover 308 is used. A dashed line 502 and a dashed line 504 may indicate boundaries of a field of view of a camera. To be specific, the camera may collect an image of an area between the dashed line 502 and the dashed line 504. The charging port cover 308 is located in the area. A location 1 may indicate a current location of the charging connector, an arrow 506 may indicate a moving direction of a charging connector, and a location 2 may indicate a location of the charging connector after the charging connector moves along the arrow 506. For example, in a process in which a charging connector 200 enters the field of view of the camera in a direction indicated by an arrow and approaches the charging port cover 308, the camera may collect images of the process. For example, when the charging connector is at the location 1, an image collected by the camera may be an image 510 shown in FIG. 5B, and the image 510 may include a part of an area of a vehicle. For another example, when the charging connector moves to the location 2, an image collected by the camera may be an image 520 shown in FIG. 5C. Pixels occupied by the charging connector in the image 510 may be less than pixels occupied by the charging connector in the image 520. Because the image 510 and the image 520 are images collected by the same camera, a size of the image 510 may be the same as that of the image 520, and a proportion of the charging connector in the image 510 is less than a proportion of the charging connector in the image 520. In some possible implementations, because an image collected by the camera may be distorted, images shown in FIGS. 5B and 5C may also be images obtained after distortion correction processing is performed on the images collected by the camera sensor.

Figure 6B:
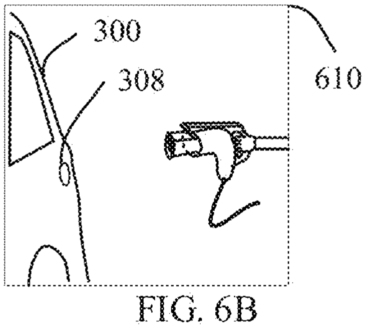
FIG. 6A, FIG. 6B, and FIG. 6C are schematic diagrams of another charging scenario according to an embodiment of this disclosure.
Figure 6A:
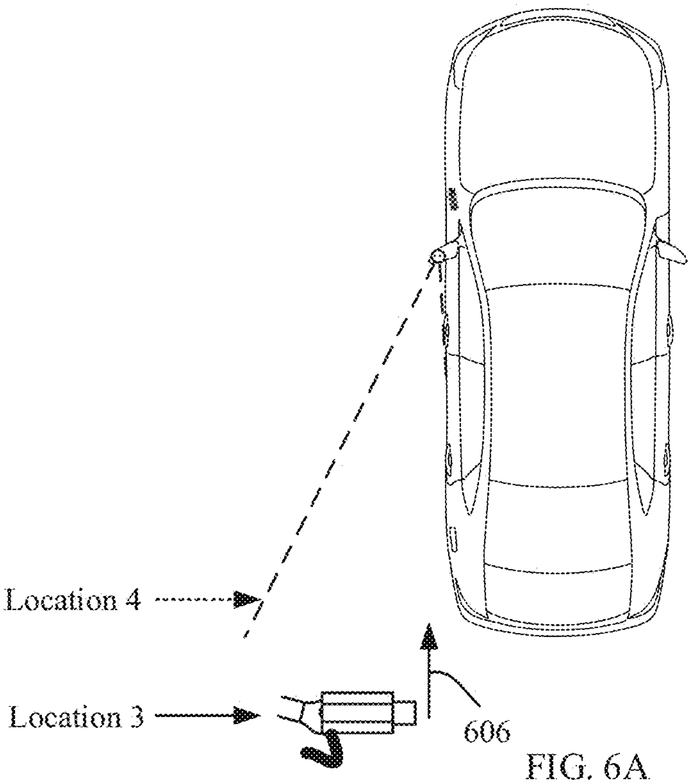
Figure 6C:
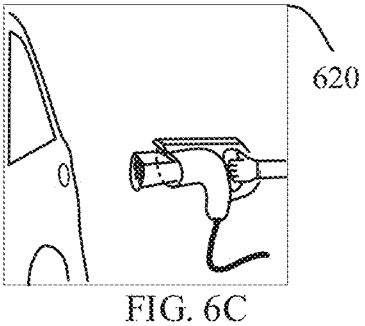

For example, FIGS. 6A-6C is a schematic diagram of another charging scenario according to an embodiment of this disclosure. As shown in FIG. 6A, an example in which an installation location of a charging port cover is at a charging port cover 308 is used. Dashed lines indicate boundaries of a field of view of a camera. A location 3 may indicate a current location of a charging connector, an arrow 606 may indicate a moving direction of the charging connector, and a location 4 may indicate a location of the charging connector after the charging connector moves along the arrow 606. For example, when a charging connector 200 is located in the field of view of the camera, and there is a specific distance between a location of the charging connector 200 and the installation location of the charging port of a vehicle, when the charging connector may approach a charging port of the vehicle in a direction shown by the arrow 606, the camera may collect an image of the process. For example, when the charging connector is located at the location 3, the charging connector is located 0.5 meter behind the vehicle, and an image collected by the camera may be an image 610 shown in FIG. 6B. When the charging connector moves to the location 4, an image collected by the camera may be an image 620 shown in FIG. 6C. Pixels occupied by the charging connector in the image 610 may be less than pixels occupied by the charging connector in the image 620. Because the image 610 and the image 620 are images collected by the same camera, a size of the image 610 may be the same as that of the image 620. In other words, a proportion of the charging connector in the image 610 is less than a proportion of the charging connector in the image 620. In some possible implementations, the image 610 and the image 620 may alternatively be images obtained after distortion correction processing is performed on the images collected by the camera sensor.

It should be understood that descriptions of the charging scenario in FIGS. 5A-5C and FIGS. 6A-6C are only examples. For example, the charging port may alternatively be located at locations of 302 or 304 shown in FIG. 3, and correspondingly, environment information around the location may be obtained.

For example, a location of the charging connector may be determined based on data collected by a radar sensor. For example, after the charging connector is recognized, the radar sensor may be started, and the location of the charging connector is determined based on information (for example, point cloud data) obtained by the radar sensor.

Because costs of the lidar are high, in some possible implementations, the location of the charging connector may be determined by using the image information obtained by the camera sensor, to determine the distance and a relative location change between the charging connector and the charging port cover.

In some possible implementations, controlling the charging port cover to open when a distance between the charging connector and the charging port cover is less than or equal to a first threshold may include controlling the charging port cover to open when it is detected that the distance between the charging connector and the charging port cover is less than or equal to the first threshold, and the charging connector moves towards a location of the charging port cover.

In this embodiment of this disclosure, the charging port cover is controlled to open with reference to the distance between the charging connector and the charging port cover and a motion status of the charging connector. This can reduce a probability of opening the charging port cover by mistake, and can improve user experience.

For example, the method may further include obtaining a first location and a second location when the charging connector is recognized, where the first location may be a location of the charging connector at a first moment, the second location may be a location of the charging connector at a second moment, and the first moment is earlier than the second moment, and controlling the charging port cover to open when it is detected that the distance between the charging connector and the charging port cover is less than or equal to the first threshold, and the charging connector moves towards a location of the charging port cover may include controlling the charging port cover to open when it is determined that a distance between the second location and the charging port cover is less than or equal to the first threshold, and the distance between the second location and the charging port cover is less than a distance between the first location and the charging port cover.

A relative location relationship between the charging connector and the charging port cover may be represented by the distance between the charging connector and the charging port cover. Because the charging port cover and a sensor that determines information about the distance between the charging connector and the charging port cover are both disposed on the vehicle, a location relationship between the charging port cover and the sensor is fixed. Therefore, in this embodiment of this disclosure, the sensor obtains the location of the charging connector, and determines the relative location relationship between the charging port cover and the charging connector. In this way, a process of determining the distance between the charging connector and the charging port cover can be simplified. For example, based on the location of the charging connector and an area in which the location of the charging connector is located, the relative location relationship between the charging connector and the charging port cover can be determined based on the location of the charging connector and the area in which the location of the charging connector is located without obtaining an actual value of the distance between the charging connector and the charging port cover. Therefore, complexity of determining a relative location between the charging connector and the charging port cover can be reduced, this also helps reduce complexity of determining a motion status of the charging connector, and helps reduce resource overheads.

For example, the first location and the second location may be determined based on image information of the charging connector at the first moment and the second moment. For example, because the location of the camera sensor on the vehicle is fixed, the location of the charging connector may be estimated based on an image and an intrinsic parameter and an extrinsic parameter of the camera. For example, the image is the image 510. Different types of charging connectors that match a charging port of the vehicle may have a same or similar characteristic structure (for example, a charging connector head). Therefore, based on a location of the characteristic structure in an image, a pixel size, and the like, a calibration result of the camera and an image of the camera may be combined, for example, an actual size of a vehicle body part like a window with a known size in the image 510 and a pixel area of the vehicle body part in the image are combined, and a location of the charging connector in an actual scenario may be determined, so that the distance between the charging connector and the charging port cover may be determined. For example, if the distance is less than or equal to the first threshold (for example, 50 centimeters or 60 centimeters), it may be considered that the user may have a charging intention. The first threshold may alternatively be another value. For another example, the location of the charging connector may alternatively mean an area in which the charging connector is located. The image 610 and the image 620 are used as an example. Based on a calibration result of the camera and the image, the image 610 includes the entire charging connector, and the charging connector occupies a small quantity of pixels in an area in the image. It may be determined that the location of the charging connector in the image 610 is actually in a rear area of the vehicle (for example, in an area that is 1.5 meters to 1.8 meters away from the charging port). Similarly, it may be determined that the charging connector in the image 620 is located in an area between the vehicle charging port and a last end of the vehicle (for example, located in an area 0.5 meter to 0.8 meter away from the charging port on a rear side of the charging port). Further, it may be determined, based on areas in which the charging connector is located at the two moments, that the charging connector moves towards a location of the charging port cover. Alternatively, it is determined, based on areas in which the charging connector is located, whether the distance between the charging connector and the charging port cover is less than or equal to the first threshold. For example, the first threshold means that when the distance between the charging connector and the charging port cover in a vertical axis direction of the vehicle is 1 meter, the distance between the charging connector and the charging port cover in the image 620 is less than the first threshold. For another example, within a preset area range (for example, an area in which the distance between the charging connector and the charging port cover is 0.8 meter in the vertical axis direction of the vehicle) near the charging port, it may be considered that the distance between the charging connector and the charging port cover is less than or equal to the first threshold, therefore, it may be considered that the user has an intention of charging the vehicle by using the charging connector, and the charging port cover may be controlled to open. For another example, because locations of the charging port and the camera in the vehicle are fixed, a location and an area of the charging connector in a preset coordinate system may be determined based on the coordinate system and an image, and a location relationship between the charging port and the charging connector in the coordinate system is determined based on the coordinate system. The first threshold may be a preset distance threshold in the preset coordinate system. For another example, a location of a user holding the charging connector may be determined based on the image 510 and with reference to an image collected by a surround view system of the vehicle, and the like through feature comparison, to represent the location of the charging connector. For example, when the distance between the charging connector and the charging port is less than or equal to a preset threshold, the charging port may be controlled to open.

In some possible implementations, a movement direction of the charging connector relative to the charging port cover may be determined based on the first location and the second location. For example, when the distance between the charging connector and the charging port cover becomes smaller, it may be determined that the charging connector moves towards the location of the charging port cover. For example, FIGS. 5A-5C is used as an example. It may be determined, based on the images 510 and 520, that the charging connector is located in a range of a left area of the charging port cover, and corresponding moments are a moment 0 and a moment 1. Based on pixel areas occupied by the charging connector in the image 510 and the image 520, based on that locations of the charging connector in the vertical axis direction of the vehicle are close to each other at the two corresponding moments, and based on that an area in which the charging connector is located at the moment 1 is located on a right side of an area in which the charging connector is located at the moment 0, it may be determined that the area in which the charging connector is located at the moment 1 is closer to the charging port cover. In other words, the charging connector is approaching the charging port cover. For another example, the location relationship between the charging connector and the charging port cover at a plurality of moments within preset duration (for example, two seconds, five seconds, or 30 seconds) may be determined. When the location relationship between the charging connector and the charging port cover meets the preset condition, for example, when a distance between the charging connector and the charging port cover continuously decreases, when the distance between the charging connector and the charging port cover continuously decreases in the vertical axis direction of the vehicle, when the distance between the charging connector and the charging port cover continuously decreases in a horizontal axis direction of the vehicle, or the like, the charging port cover may open.

Figure 7:
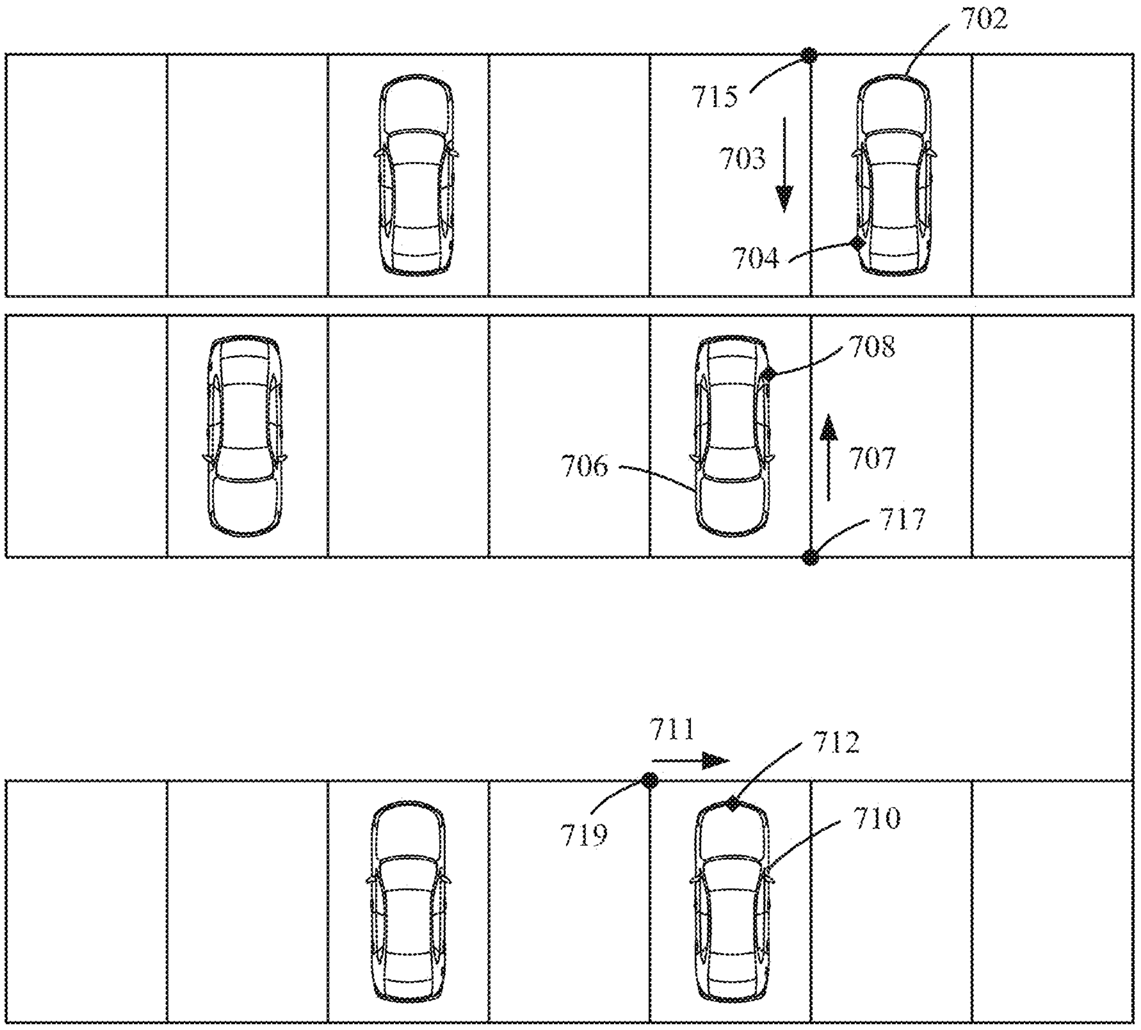
FIG. 7 is a schematic diagram of another charging scenario according to an embodiment of this disclosure.

For ease of understanding and description, FIG. 7 is a schematic diagram of another charging scenario according to an embodiment of this disclosure. A vehicle 702, a vehicle 706, and a vehicle 710 are to-be-charged vehicles. A charging port 704, a charging port 708, and a charging port 712 may be locations of charging port covers of the vehicle 702, the vehicle 706, and the 710 respectively. A node 715, a node 717, and a node 719 may be charging piles to which charging connectors configured to charge the vehicle 702, the vehicle 706, and the vehicle 710 belong. At a moment in this scenario, a user A holds a charging connector 1 from the charging pile 715 to the charging port 704 (refer to an arrow 703), a user B holds a charging connector 2 from the charging pile 717 to the charging port 708 (refer to an arrow 707), a user C holds a charging connector 1 from the charging pile 719 to the charging port 712 (refer to an arrow 711), and the vehicle 702, the vehicle 706, and the vehicle 710 may collect data of an environment around the vehicle 702, the vehicle 706, and the vehicle 710.

In some possible implementations, when a distance between the second location and the charging port cover is less than a distance between the first location and the charging port cover, and the distance between the second location and the charging port cover is less than or equal to the first threshold, the charging port cover may be controlled to open. For example, in the scenario shown in FIG. 7, the user B holds the charging connector 2 from the charging pile 717 to the charging port 708 (refer to the arrow 707). In a surrounding environment collected by the vehicle 702, a motion status of the charging connector 2 is moving towards a charging port cover 704. When a charging port cover of the vehicle 702 opens based on the motion status of the charging connector 2, a case of opening by mistake may occur. Therefore, whether a distance between the charging connector 2 and the charging port 708 is less than or equal to a first threshold may be determined based on an image, and the first threshold may be the foregoing preset threshold. Because a location of the charging connector 2 is far away from the charging port 704, it may be determined that the user B does not charge the vehicle 702 by using the charging connector 2. Therefore, accuracy of controlling opening of the charging port cover can be improved, and a possibility of opening the charging port cover by mistake can be reduced.

In some possible implementations, before the charging port cover is controlled to open, it may be further determined whether the charging connector adapts to the charging port cover.

For example, in an actual charging scenario, for example, a private charging pile in a home or a public charging pile in a parking lot may have different charging connectors. In some scenarios, the charging connector may not adapt to the charging port cover. Characteristic information of the charging connector may be obtained, and whether the charging connector adapts to the charging port cover is determined based on the characteristic information. For example, the characteristic information of the charging connector, for example, a contour, a shape, and a color of the charging connector, and a shape and a type of a charging port, may be determined by using an image. A charging connector that matches a charging port cover may have a specific characteristic. For example, a charging connector that matches a vehicle brand and a vehicle model may have a specific characteristic like a shape and a color. Through obtaining the characteristic like the shape and the color of the charging connector, it can be determined whether the shape and the color of the charging connector can adapt to the charging port cover, to avoid that the charging port cover is opened by mistake due to existence of a charging connector of another brand or model in an environment. For another example, for a vehicle that uses recommendation standards related to the charging port standard, whether the charging connector can adapt to the charging port cover may be determined based on the characteristics such as a shape and a characteristic size of a charging port of the charging connector. For another example, when a fast charging port and a slow charging port are disposed at different locations of a vehicle, because charging connectors corresponding to different charging ports may have different structures, shapes, and the like, when a user holds a charging connector with a fast charging port, for example, through obtaining characteristics such as a shape of the charging connector, a form of a charging port, and a characteristic size, it may be determined that the charging connector adapts to a fast charging port side. Therefore, a charging port cover of the fast charging port can open, and a charging port cover of a slow charging port is controlled not to open, so that a probability of opening a charging port cover by mistake is reduced. For another example, when it is determined that the charging connector does not adapt to a charging port cover, the user may be prompted with a voice, a prompt tone, or the like, so that the user perceives, in time, that the charging connector does not adapt to the charging port.

In this embodiment of this disclosure, the characteristic information of the charging connector is obtained, and it is determined that the charging connector matches the charging port cover. This can avoid that the charging connector is incorrectly opened because a type, an interface, or the like of the charging connector does not match the charging port cover, and can improve use experience of the user.

In some possible implementations, controlling the charging port cover to open when a distance between the charging connector and the charging port cover is less than or equal to a first threshold may include controlling the charging port cover to open when the charging connector is held by the user of the vehicle, and the distance between the charging connector and the charging port cover is less than or equal to the first threshold. For example, it may be determined, based on image information, whether a holder of the charging connector is a vehicle owner, a driver before the vehicle is in a parked state, or the like. For another example, it may be determined, based on out-of-vehicle data collected by a sensor by using a method like human body posture recognition and gait recognition, whether the user is a driver of the vehicle. For another example, a terminal device like a mobile phone may be connected to a vehicle, and it may be determined, based on movement paths of the charging connector and the terminal device, whether a user holding the charging connector holds the terminal device.

In some possible implementations, controlling the charging port cover to open when it is detected that a distance between the charging connector and the charging port cover is less than or equal to a first threshold may include controlling the charging port cover to open when the distance between the user of the vehicle and the vehicle is less than or equal to a preset threshold, when it is detected that the distance between the charging connector and the charging port cover is less than or equal to the first threshold, and when the charging connector is held by an authorized user of the vehicle. For example, locations of a driver, a vehicle owner, and the like may be determined based on a sensor of a vehicle. When a distance between a user of the vehicle and the vehicle is less than or equal to a preset threshold, when it is detected that another authorized user holds a charging connector and approaches a charging port cover, and a distance between the charging connector and the charging port cover is less than or equal to a first threshold, the charging port cover may open. In other words, when the distance between the user of the vehicle and the vehicle is less than or equal to the preset threshold, it may be considered that the vehicle is in a safe charging scenario, and when a location relationship between the charging connector and the charging port cover meets a corresponding condition, the charging port cover may automatically open. For another example, it may be determined, based on out-of-vehicle data collected by a sensor and by using a method like human body posture identification and gait identification, whether a holder of the charging connector is a user who walks out of a vehicle cockpit. Alternatively, it may be determined, based on data collected by a sensor in a vehicle cockpit, whether a holder of the charging connector is located in the vehicle cockpit before the vehicle parks. For another example, when a distance between a user of a vehicle and the vehicle is long, and a charging connector is held by an authorized user of the vehicle, it may be considered that the vehicle is not in a safe charging scenario. Therefore, a function that a charging port cover automatically opens may not be enabled, to avoid adverse impact on vehicle safety.

For example, an authorized user of a vehicle may include, for example, a passenger in a vehicle cockpit when the vehicle is in a driving state or before the vehicle is in a parked state, and a service person in a public place like a parking lot or a vehicle maintenance place. Correspondingly, a user that does not meet the foregoing condition may be referred to as an unauthorized user of the vehicle. In a specific implementation process, users included in the authorized user may be specified by a vehicle driver or a vehicle owner, or a specific policy may be set for filtering.

In an actual scenario, there may be another to-be-charged vehicle and another user around the vehicle, and a recognized charging connector may be held by a person other than a user of the vehicle. In this embodiment of this disclosure, whether the vehicle is in a safe charging scenario may be determined by determining whether the holder of the charging connector is an authorized user of the vehicle and the distance between the user of the vehicle and the vehicle, to determine whether a charging port cover automatically opens. In one aspect, a probability of opening the charging port cover by mistake can be reduced. In another aspect, this also helps prevent another user from performing an unfriendly behavior on the vehicle through a charging port, to improve safety performance of the vehicle.

In some possible implementations, after the charging port cover is controlled to open, a first message may be sent when the charging connector charges the vehicle, and remaining power of the vehicle is greater than or equal to a third threshold. The first message may indicate a battery level of the vehicle. For example, the third threshold may be a preset threshold, for example, 90% or 95%. When the vehicle is charged such that a battery level reaches the third threshold, the first message may be sent. Correspondingly, a terminal device like a cloud server or a mobile phone may obtain the first message by using a network device, so that a user can learn the battery level of the vehicle, to facilitate the user to perform processing in time and avoid loss on a battery caused by overcharging. For another example, when the user charges the vehicle by using a terminal device like a mobile phone in a scheduled charging manner, the third threshold may be determined based on a value set by the user. For example, when the user schedules charging the vehicle for two hours, and a vehicle charging status meets a condition set by the user, for example, when charging duration is one hour and 50 minutes, or one hour and 55 minutes, the first message may be sent.

In this embodiment of this disclosure, the user may be prompted with a charging process of the vehicle by indicating battery power of the vehicle in time, to facilitate the user to process the vehicle and the charging connector in time. This can avoid damage to a battery of the vehicle caused by overcharging, or avoid another safety accident caused by overcharging.

In some possible implementations, a first charging parameter of the charging connector may be obtained. When the first charging parameter does not match a second charging parameter of the vehicle, the user may be informed that there is an exception in a charging process.

For example, the first charging parameter may indicate a configuration parameter of a charging process of a vehicle by a charging pile and a charging connector, and the second charging parameter may indicate a requirement of the vehicle for the charging process. For example, a vehicle may have a wireless communication function. For a charging connector and a charging pile that have a wireless communication function, an apparatus (for example, an apparatus like a vehicle-mounted chip, a head unit system, a computing platform, or a processor) that implements the method may obtain, through information exchange between the charging connector and the charging pile and an internal circuit of the vehicle, a configuration parameter of a charging process provided by the charging pile and the charging connector for charging, may obtain a requirement parameter of the vehicle for the charging process through the internal circuit of the vehicle, and when the requirement parameter does not match the configuration parameter, may inform the user that there is an exception in the charging process by using an interaction apparatus like a central display screen, a speaker, or a mobile terminal of the user. For another example, when a user inserts a charging connector into a charging port, the charging connector may be connected to the charging port. For example, a charging pile may communicate with a vehicle by using the charging connector. The charging pile may determine a parameter configured for a current charging process, namely, a first charging parameter, for example, a parameter like a voltage output value, a current output value, or whether charging is allowed. A battery management system of the vehicle may determine a charging requirement of the vehicle, namely, a second charging parameter, for example, a parameter like a voltage requirement, a current requirement, or a charging mode, and may monitor the charging requirement and charging configuration in real time during the charging phase. For another example, when a battery output value and a current output value are low and cannot meet a preset condition and cannot match a charging requirement of a vehicle, a second message may be sent. Correspondingly, a terminal device like a mobile phone associated with the vehicle may obtain the second message by using a network device, a cloud server, or the like. Further, the mobile phone may display, on an interface of the mobile phone, "The charger power is low in the charging process, check whether the charger matches the vehicle, and the charging process will automatically stop after XX minutes", to inform the user that there is an exception in the charging process. For another example, when a charging connector is connected to a charging port, when charging configuration information is partially or completely missing, and when a vehicle cannot normally communicate with a charging pile by using the charging connector, it may be determined that a charging configuration parameter does not match a charging requirement parameter, and a second message may be sent to indicate that there is an exception in a charging process. Correspondingly, a terminal device like a mobile phone may obtain the second message by using a network device, a cloud server, or the like, to inform a user that there is an exception in the charging process. For another example, after it is determined that a user inserts a charging connector into a charging port, when it is detected, within preset duration (for example, 10 seconds or 20 seconds), that charging configuration information does not match charging requirement information, it may be considered that the user is near a vehicle, and the user may be informed, by using a voice, a prompt tone, or the like, that there is an exception in the charging process.

In this embodiment of this disclosure, when the first charging parameter does not match the second charging parameter, the user is informed that there is an exception in the charging process, so that the user can confirm statuses of the vehicle and the charging connector in time, to avoid that the user cannot learn in time that a charging effect of the charging connector cannot reach an expected charging effect. This can improve use experience of the user.

In some possible implementations, the charging port cover may be controlled to close when the charging port cover is in an open state and the vehicle ends a charging state. For example, the charging port cover may be in an open state. After it is detected that vehicle charging ends, for example, when it is detected that the charging connector is removed, the charging port cover may be controlled to close.

In this embodiment of this disclosure, when it is detected that the charging connector is removed from the charging port cover, the charging port cover is controlled to close. This can implement automatic control of the charging port cover in an entire charging process, and therefore can improve user experience.

In some possible implementations, before controlling the charging port cover to close, the method may further include determining that a distance between a human body part of the user and the charging port cover is greater than or equal to a fourth threshold. For example, the human body part may be a face, an arm, a hand, a head, or the like of a human body. For another example, the fourth threshold may be a preset safe distance, for example, 30 centimeters or 40 centimeters. When it is determined that the distance between the human body part and the charging port cover is greater than or equal to a safe distance, it may be determined that no damage is caused to the user in a process in which the charging port cover closes. For another example, that the distance between the human body part and the charging port cover is greater than or equal to the fourth threshold may be that the distance between the human body part and the charging port cover is greater than or equal to a safe distance (for example, 30 centimeters or 45 centimeters), or may be that the human body part is outside a preset area range (for example, an area within 50 centimeters or 60 centimeters away from the charging port) near the charging port cover. In this case, it is considered that the distance between the human body part and the charging port cover is greater than or equal to the fourth threshold.

In this embodiment of this disclosure, the distance between the charging port cover and the human body part is determined, so that the user can be prevented from being injured in a process in which the charging port cover closes, to ensure personal safety of the user.

For example, the vehicle may include a mechanism, an apparatus, or the like that performs an operation of opening or closing of the charging port cover. For example, the charging port cover may open or close by using an execution mechanism like a motor.

For example, controlling the charging port cover to open or close may be controlling the charging port cover to open or close by using the execution mechanism. The charging port cover may include the execution mechanism, or the execution mechanism may be an apparatus other than the charging port cover. Further, controlling the charging port cover to open or close may be directly controlling the execution mechanism to open or close the charging port cover, or may be controlling the execution mechanism by using another control apparatus, to open or close the charging port cover.

In some possible implementations, when the operation of closing the charging port cover fails, a quantity of failure times may be obtained, and when the quantity of failure times is greater than or equal to a fifth threshold, the operation of closing the charging port cover may be interrupted. For example, a fifth threshold is 3. At a moment t1, a user removes a charging connector, and a vehicle ends charging. At the moment t1, when it is determined that there is no hand or arm near a charging port cover, the charging port cover is controlled to close. At a moment t2, the charging port cover fails to close due to an obstacle like a dried branch, a fallen leaf, or a small rock, and the charging port cover may be stopped from closing this time. At a moment t3, when it is detected again that there is no characteristic object around a charging port, the charging port cover may be controlled to close again. At a moment t4, the charging port cover fails to close because the obstacle like a dried branch, a fallen leaf, or a small rock is not cleared. Then, scenario recognition is performed again and the charging port cover is controlled to close. At a moment t5, the operation of closing the charging port cover has been performed for three times, and the charging port cover is still in an open state. Therefore, it can be determined that the quantity of failure times of closing of the charging port cover is three. Because the quantity of failure times is greater than or equal to the fifth threshold, the operation of closing the charging port cover may be stopped, to stop a function that the charging port cover automatically closes, so that the charging port cover can be prevented from being damaged by an obstacle in a process in which the charging port cover automatically closes. For another example, when automatically closing of the charging port cover is stopped, the user may be informed, by using a voice, a prompt tone, or the like, that the charging port cover fails to close, and the user is prompted to check the charging port cover. For example, the user may be prompted by using a display apparatus like a central control screen or an interaction apparatus like a speaker of the vehicle (for example, the user may be prompted by displaying, by a display apparatus like a central control screen, or by broadcasting, by a voice, "The charging port cover does not close, check the charging port", or "The charging port cover does not automatically close, close the charging port cover manually", or may be prompted by an indicator light). Certainly, the fifth threshold may alternatively be another value, for example, five or seven.

For example, resistance in a process in which the charging port cover closes may be obtained. When the resistance is greater than or equal to a resistance threshold, the operation of closing the charging port cover may be interrupted. For example, the resistance threshold may be 25 N, 30 N, or the like. For another example, a working status of the execution mechanism may be obtained. For example, when the execution mechanism is a motor, information such as a voltage and a current of the motor may be obtained. For example, when the information is greater than a preset condition (for example, a working current is close to a locked-rotor current of the motor), it may be considered that a process in which the charging port cover closes is blocked. In other words, it may be determined, based on a working status parameter of the execution mechanism, whether the resistance is greater than or equal to the resistance threshold.

In this embodiment of this disclosure, a quantity of times that the charging port cover fails to close is obtained, and when the quantity of failure times is greater than or equal to the fifth threshold, closing of the charging port cover is terminated, so that damage to the charging port cover caused by existence of an obstacle in a closing process can be avoided.

In some possible implementations, the method further includes obtaining data collected by a second sensor, and determining the distance between the user of the vehicle and the vehicle based on the data collected by the second sensor, and controlling a first sensor to be in an enabled state when a distance between a user of the vehicle and the vehicle is less than or equal to a second threshold, and the charging port cover of the vehicle is in a closed state may include, when the distance between the user of the vehicle and the vehicle is less than or equal to the second threshold, and the charging port cover is in the closed state, controlling the first sensor to be in the enabled state, and disabling the second sensor. For example, when it is detected that the user drives into a target parking spot, when it is detected that the user triggers parking braking (for example, pulls up a hand brake), when it is detected that the vehicle is powered off, or when it is detected that the user opens a vehicle door, the second sensor may be controlled to be in an enabled state, and a surrounding environment of the vehicle may be monitored, to obtain the distance between the user and the vehicle in time, so that displacement information of a charging connector can be obtained in time when the user plans to charge the vehicle subsequently by using a charging connector, so that the charging port cover opens in time, and therefore, user experience is improved. For another example, the second sensor may be a sensor or the like included in a surround view system. When it is determined, based on information collected by the second sensor, that the distance between the user and the vehicle is less than or equal to the second threshold (for example, when the second threshold is 2 meters, 3 meters, or 1.5 meters, or the user is in a preset range or a preset area like 2 meters or 3 meters around a vehicle charging port, it is considered that the distance between the user and the vehicle is less than or equal to the second threshold), the first sensor may be controlled to be in the enabled state, and the second sensor is disabled, to reduce sensor power consumption. For another example, the second sensor may be an ultrasonic radar, a millimeter-wave radar, or the like located near an installation location of the charging port cover. It may be determined, by using data collected by the radar, that the distance between the user and the vehicle is less than or equal to the second threshold. For another example, after a parking operation of the user is detected, and when the user is not detected within preset duration (for example, 2 minutes or 3 minutes), the second sensor may be disabled, to reduce sensor power consumption.

In this embodiment of this disclosure, in a process in which the user holds the charging connector to approach the vehicle, the process is split, so that roles of sensors with different functions in different phases of the process can be refined. This helps more properly use, based on content such as a sensing range and an operating characteristic of the sensor, information obtained by the sensor, and helps reduce total sensor power consumption. For an intelligent vehicle or a new energy vehicle, this helps increase an endurance mileage of the intelligent vehicle or the new energy vehicle.

For example, after the charging port cover is controlled to open, when it is determined that the charging connector is connected to the charging port, the first sensor may be controlled to be disabled, to reduce sensor power consumption.

In some possible implementations, after the vehicle ends the charging state, the first sensor may be enabled. For example, when it is detected that the charging connector is disconnected from the vehicle, the first sensor may be enabled, to obtain an image around the charging port cover collected by the camera, and whether there is a human body part such as an arm, a hand, or a head around the charging port cover may be determined based on the image. For another example, after preset duration (for example, eight seconds or 10 seconds) for which the charging connector is disconnected from the vehicle is detected, the first camera may be started.

In this embodiment of this disclosure, after it is determined that the vehicle ends the charging state, the first camera is started, so that power consumption of a sensor configured to recognize an anti-pinch scenario can be reduced. For an intelligent vehicle or a new energy vehicle, an endurance mileage of the intelligent vehicle or the new energy vehicle can be improved.

In some possible implementations, in response to a first operation of the user, the charging port cover may also be controlled to open or close.

For example, the first operation may be a voice interaction operation, a gesture interaction operation, or the like of the user. For example, when it is determined, based on a voice instruction or a gesture instruction of the user, and based on detection of a line of sight of the user, that the user has a charging intention, the charging port cover is controlled to open, or when it is determined that the user has an intention of closing the charging port cover, the charging port cover is controlled to close. For example, when it is detected that the user performs voice interaction by using an operation like a wake-up word, tapping a physical or virtual button, when corresponding charging keywords, for example, "I want to charge the vehicle" or "Open the charging port cover", are detected based on the obtained voice instruction, the charging port cover may be controlled to open. For another example, when corresponding charging end keywords, for example, "The vehicle is fully charged" or "Close the charging port cover", the charging port cover may be controlled to close. For another example, a gesture motion of the user may be recognized by using data obtained by a sensor like a camera in a cockpit, and therefore, a gesture instruction corresponding to opening or closing of the charging port cover may be detected. For another example, a fixation point of the user may be determined by detecting a line of sight of the user. For example, when it is detected that the fixation point of the line of sight of the user is on an endurance mileage, a battery level of the vehicle, or the like on a dashboard screen, and when battery power of the vehicle is less than or equal to a preset threshold (for example, 20% or 25%), it may be considered that the user has an intention of charging the vehicle, to control the charging port cover to open. For another example, by combining sensors inside and outside a cockpit, when it is determined that the fixation point of the line of sight of the user is on a charging pile, and when the battery power of the vehicle is less than or equal to the preset threshold, it may be considered that the user has the intention of charging the vehicle, to control the charging port cover to open. For another example, when it is detected that the vehicle ends the charging state, and the fixation point of the line of sight of the user is on the charging port cover in the open state, the charging port cover may be controlled to close.

Figure 8A:
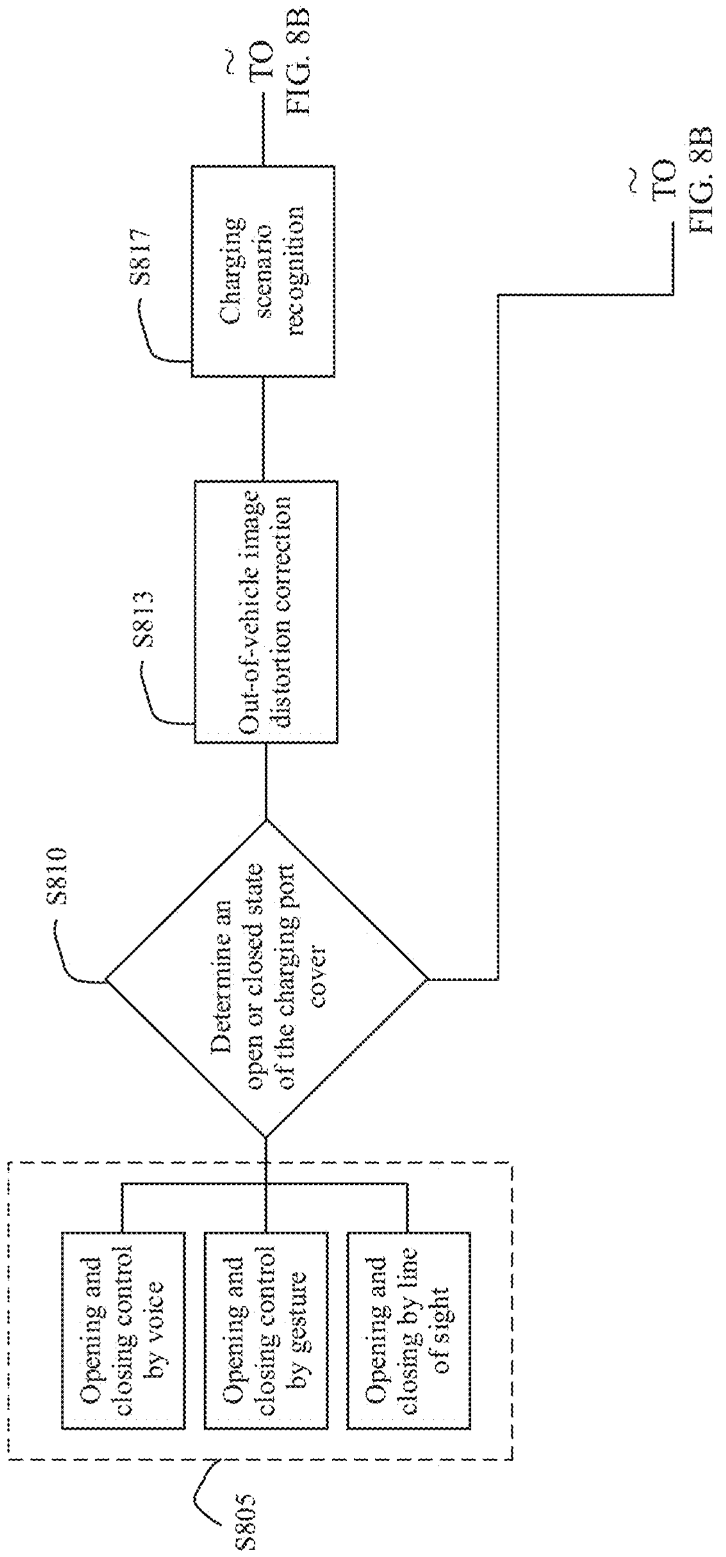
FIG. 8A, FIG. 8B, and FIG. 8C are schematic flowcharts of a control method according to an embodiment of this disclosure.
Figure 8B:
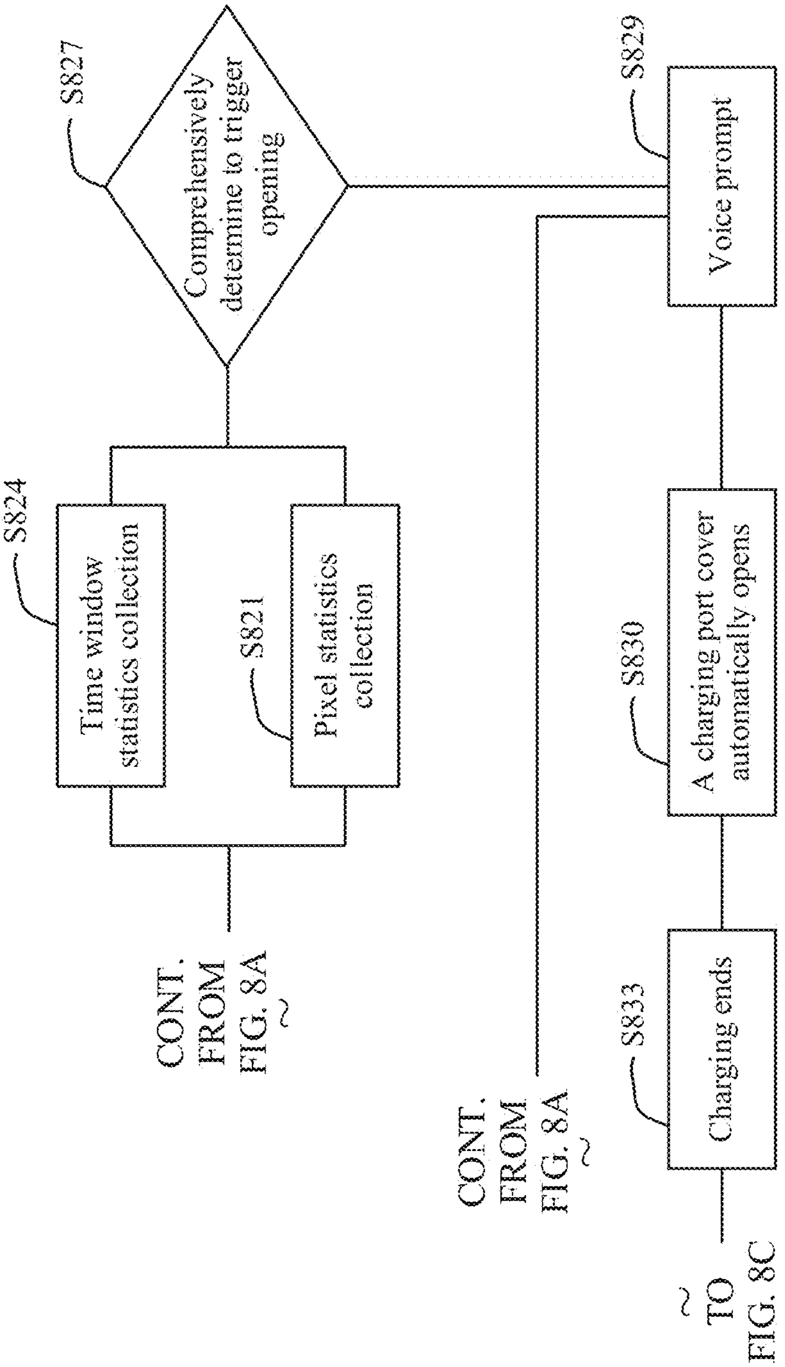
Figure 8C:
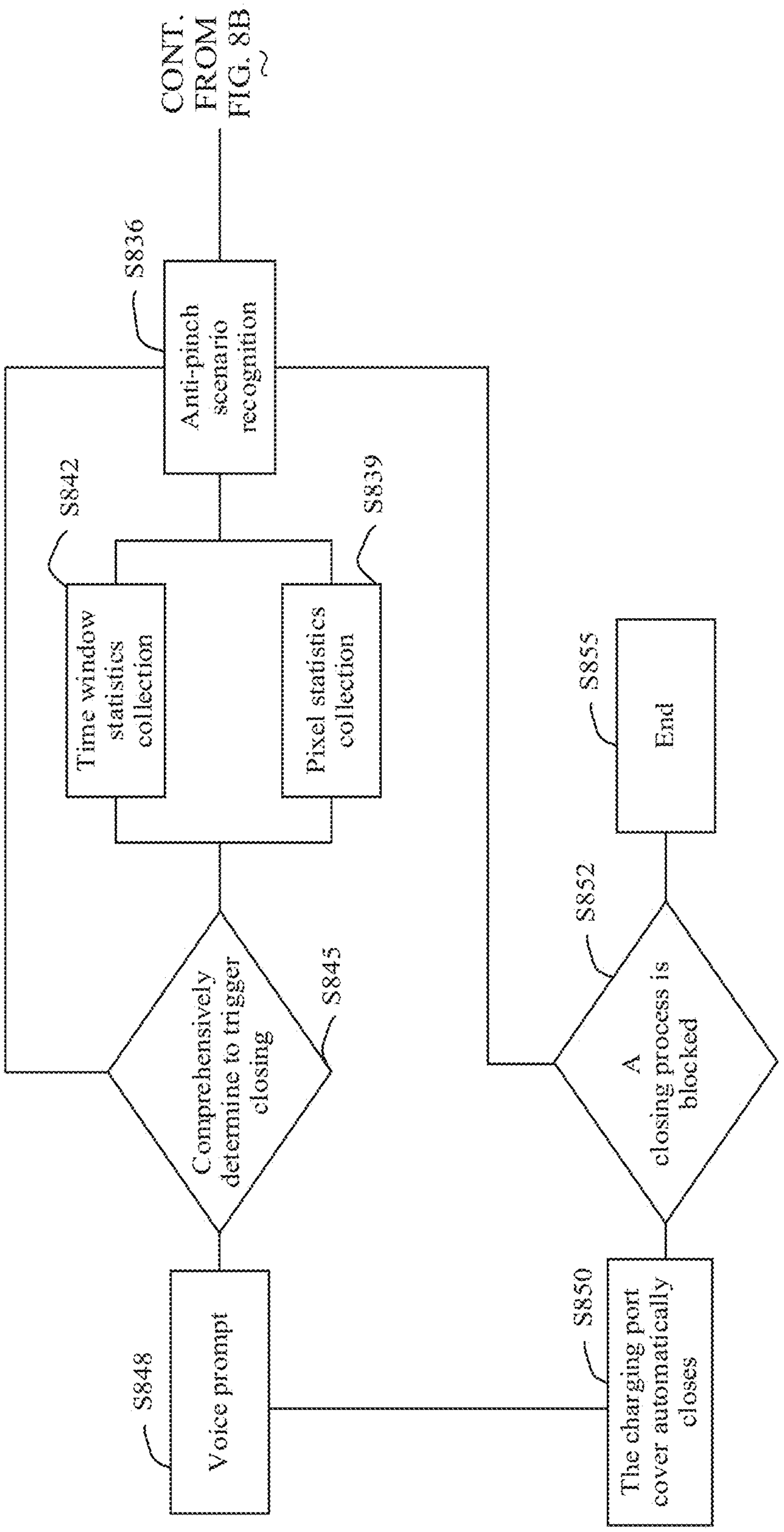

For example, FIG. 8A to FIG. 8C are a schematic flowchart of a vehicle control method according to an embodiment of this disclosure. The method 800 may include some or all of the following steps.

Optionally, S805: Obtain a first operation.

For example, an operation of a user may be recognized by using a sensor in a cockpit. Further, in response to the first operation, a charging port cover may be controlled to open. For example, when it is determined that a vehicle is driving into a parking lot, when the vehicle is parked, when the vehicle is in a parking spot, when the user triggers parking braking (for example, pulls up a hand brake), or when a charging pile outside the vehicle is detected, a microphone in the cockpit, a sensor configured to recognize a gesture instruction, and a sensor configured to detect a line of sight may be controlled to be started, data collected by the sensor may be obtained, and whether the user has a charging intention may be determined based on the data collected by the sensor. Further, when the first operation is detected, the charging port cover may be controlled to open.

Optionally, S810: Determine an open or closed state of the charging port cover.

For example, a control status of the charging port cover may be obtained. For example, when the first operation is detected, it may be determined that control information for the charging port cover is received, and S829 may be performed. When the first operation is not detected, it may be determined that control information for opening or closing of the charging port cover is not obtained. Therefore, S813 may be performed, and whether the charging port cover needs to be controlled to open is determined by obtaining environment information around the charging port cover.

S813: Obtain an out-of-vehicle image collected by a camera sensor, and perform distortion correction processing on the image.

For example, an out-of-vehicle image collected by one or more camera sensors may be obtained, or an out-of-vehicle image collected by a camera sensor corresponding to a charging port may be obtained. Further, processing such as filtering and distortion correction may be performed on the image.

For example, an out-of-vehicle image within preset duration may be obtained. For example, when the vehicle is parked, a camera sensor corresponding to the charging port cover may be enabled, and the camera sensor is controlled to collect data, so that an image collected by the camera may be obtained in real time. For example, when a charging connector is not detected within the preset duration (for example, within 2 minutes, 5 minutes, or 5 minutes after the vehicle is locked) after the vehicle is parked, the sensor may be disabled, to stop automatically triggering a function that the charging port cover opens or closes. When a charging connector is detected within the preset duration, charging scenario recognition can be performed, to determine whether to control the charging port cover to open.

S817: Perform charging scenario recognition.

For example, a charging scenario may be recognized based on a status of the vehicle and a surrounding environment. For example, when a charging pile is detected around a vehicle, when it is determined that the vehicle moves into a parking lot, when it is detected that a user triggers parking braking, when it is detected that the vehicle is in a parked state, or when a battery level of the vehicle is less than or equal to a preset threshold, a charging scenario may be recognized, and a charging connector, a user, and a human body part like a human hand, or an arm may be recognized by using an image.

For example, one or more of the following conditions may be determined. The vehicle is in a parked state, whether characteristic information of the charging connector can match the vehicle, a holder of the charging connector is a user of the vehicle, or the holder of the charging connector is an authorized user of the vehicle, and the distance between the user of the vehicle and the vehicle is less than or equal to a preset threshold.

For example, for descriptions of recognizing the charging scenario, refer to steps S410 to S430. For brevity, details are not described herein again.

S821: Perform pixel statistics collection.

For example, statistics may be collected on a pixel area occupied by a charging connector in an image. For example, after a charging connector is detected based on an image, a pixel size of the charging connector in the image, a pixel area of the charging connector in the image, and the like are determined, to determine a location of the charging connector. For another example, the charging connector may be compared with a charging connector in a corresponding posture in a database, to determine a location of the charging connector.

S824: Perform time window statistics collection.

For example, a motion status of a charging connector may be determined based on a time window of preset duration. For example, a motion status of a charging connector in a time period may be determined based on an image of the charging connector within preset duration (for example, four seconds or six seconds). For example, when a charging connector moves in a direction away from a charging port cover, it may be considered that a user does not intend to charge a vehicle by using the charging connector. For another example, when a charging connector moves towards a location of a charging port cover, it may be considered that a user has an intention to charge a vehicle by using the charging connector.

It should be understood that S821 and S824 may be performed simultaneously, or S821 may be performed first, or S824 may be performed first.

S827: Comprehensively determine whether to trigger opening.

For example, whether a charging port cover needs to be controlled to open may be determined based on a pixel statistics collection result and a time window statistics collection result. For example, when a distance between a charging connector and a charging port cover is less than or equal to a first threshold, and the charging connector moves towards the charging port cover, the charging port cover may be controlled to open, when a location of the charging connector is within a preset area range, and the charging connector moves towards a location of the charging port cover, the charging port cover may be controlled to open, or when the location of the charging connector is within the preset area range, and the charging connector moves in the direction away from the charging port cover, the charging port cover may not be controlled to open.

Optionally, S829: Perform a voice prompt.

In some possible implementations, when it is determined to control a charging port cover to open, a user may be prompted by using a voice. For example, the voice prompt may be "The charging port cover will soon open", "The charging port cover will open", or the like, or may be a prompt tone with a specific frequency, for example, a continuous prompt tone of "Beep-Beep-Beep".

S830: A charging port cover opens.

For example, an execution mechanism that performs an operation of opening of a charging connector cover may open the charging connector cover. For example, after the charging port cover opens, when it is detected that the charging connector is connected to the vehicle, the first sensor may be disabled.

S833: Charging ends.

For example, when it is detected that a charging connector is disconnected from a vehicle, it may be determined that charging ends. For example, when it is determined that a battery level of a vehicle is greater than or equal to a specific threshold (for example, 90%, 95%, or 100%), or vehicle charging duration meets preset duration (for example, three hours or five hours), a first message may be sent to prompt the user.

Optionally, S836: Perform anti-pinch scenario recognition.

For example, after it is determined that charging ends, anti-pinch scenario recognition may be performed. For example, when it is detected that a user removes a charging connector from a charging port, a camera corresponding to a charging port cover may be enabled, and the camera is controlled to collect an image. When it is determined, based on the image, that there is a human body part around the charging port, anti-pinch scenario recognition may be performed, to prevent injury to a user in a process of controlling the charging port cover to close. For another example, when it is determined, based on the image collected by the camera, that there is no human body part around the charging port, it may be considered that the user is in a safe range, and the charging port cover may be controlled to close.

S839: Perform pixel statistics collection.

In some possible implementations, in the anti-pinch scenario, a characteristic part may be a hand, an arm, a head, or the like of a human body.

For example, statistics may be collected on a pixel area occupied by a characteristic human body part in an image. For example, after a human body characteristic is detected based on an image, a posture (for example, a hand posture, an arm posture, or a head posture around a charging port cover) of a human body in the image, a pixel size of the human body in the image, a location of the human body in the image, and the like are determined. For example, the human body may be compared with a human body in a corresponding posture in a database, to determine a location of the human body in an actual scenario.

S842: Perform time window statistics collection.

For example, a motion status of a characteristic human body part may be determined based on a time window of preset duration. For example, a motion status of a human body in a time period may be determined based on an image of the human body within the preset duration (for example, five seconds or three seconds). For example, when a user moves in a direction away from a charging port cover, it may be considered that closing of the charging port cover does not affect the user. For another example, when the user moves in a direction close to the charging port cover, it may be considered that the user may be pinched when the charging port cover closes.

It should be understood that S839 and S842 may be performed simultaneously, or S839 may be performed first, or S842 may be performed first.

S845: Comprehensively determine whether to trigger closing.

For example, whether to control the charging port cover to close may be determined based on a pixel statistics collection result and a time window statistics collection result. For example, when a distance between a characteristic human body part (for example, a hand, an arm, or a head of a human body) near a charging port cover and the charging port cover is greater than or equal to a preset threshold (for example, 20 centimeters or 25 centimeters), the charging port cover may be controlled to close, when a hand, an arm, or the like closest to the charging connector cover is within a preset area range, and moves towards the charging port cover, the charging port cover may not be controlled to close, and when a location of a user is outside the preset area range, and the charging connector moves in a direction away from the charging port cover, the charging port cover may be controlled to close.

For example, for a description of determining to control the charging port cover to close, refer to step S430.

Optionally, S848: Perform a voice prompt.

For example, when it is determined that a charging port cover is controlled to close, a user may be prompted by using a voice. For example, the voice prompt may be “The charging port cover will soon close”, “The charging port cover will close”, or the like, or may be a prompt tone with a specific frequency, for example, a continuous prompt tone of “Beep-Beep-Beep”.

S850: The charging port cover closes.

For example, an execution mechanism that performs an operation of closing a charging connector cover may close the charging connector cover.

Optionally, S852: Determine whether a closing process is blocked.

In some possible implementations, whether a process in which the charging port cover closes is blocked may be determined based on whether an operation of closing the charging port cover is successfully performed, or whether the process is blocked may be determined based on resistance suffered when the charging port cover closes in a closing process. For example, after it is determined that a charging port cover is controlled to close, a status of the charging port cover is determined after a preset time period (for example, five seconds or three seconds). When the charging port cover is still in an open state, it may be determined that the charging port cover fails to close, so that anti-pinch scenario recognition may be performed again. For another example, after it is determined that a charging port cover is controlled to close, a motion status of an execution mechanism configured to perform an operation of closing the charging port cover may be obtained. For example, when the execution mechanism is a motor, it may be determined whether an electrical parameter like a voltage or a current of the motor in a specific period of time is normal. When an operating current of the motor is excessively large (for example, close to a locked-rotor current of the motor), it may be considered that the motor is blocked in an operating process. For another example, when it is determined that the closing process is blocked, a user may be informed, by using a voice, a prompt tone, or the like, that the closing process of the charging port cover is blocked.

S855: End.

For example, when it is determined that the charging port cover closes normally, the first sensor may be disabled.

In this embodiment of this disclosure, a charging scenario and an anti-pinch scenario are recognized, so that a charging port cover can be automatically controlled in an entire vehicle charging process. This can improve use experience of the user.

Figure 9:
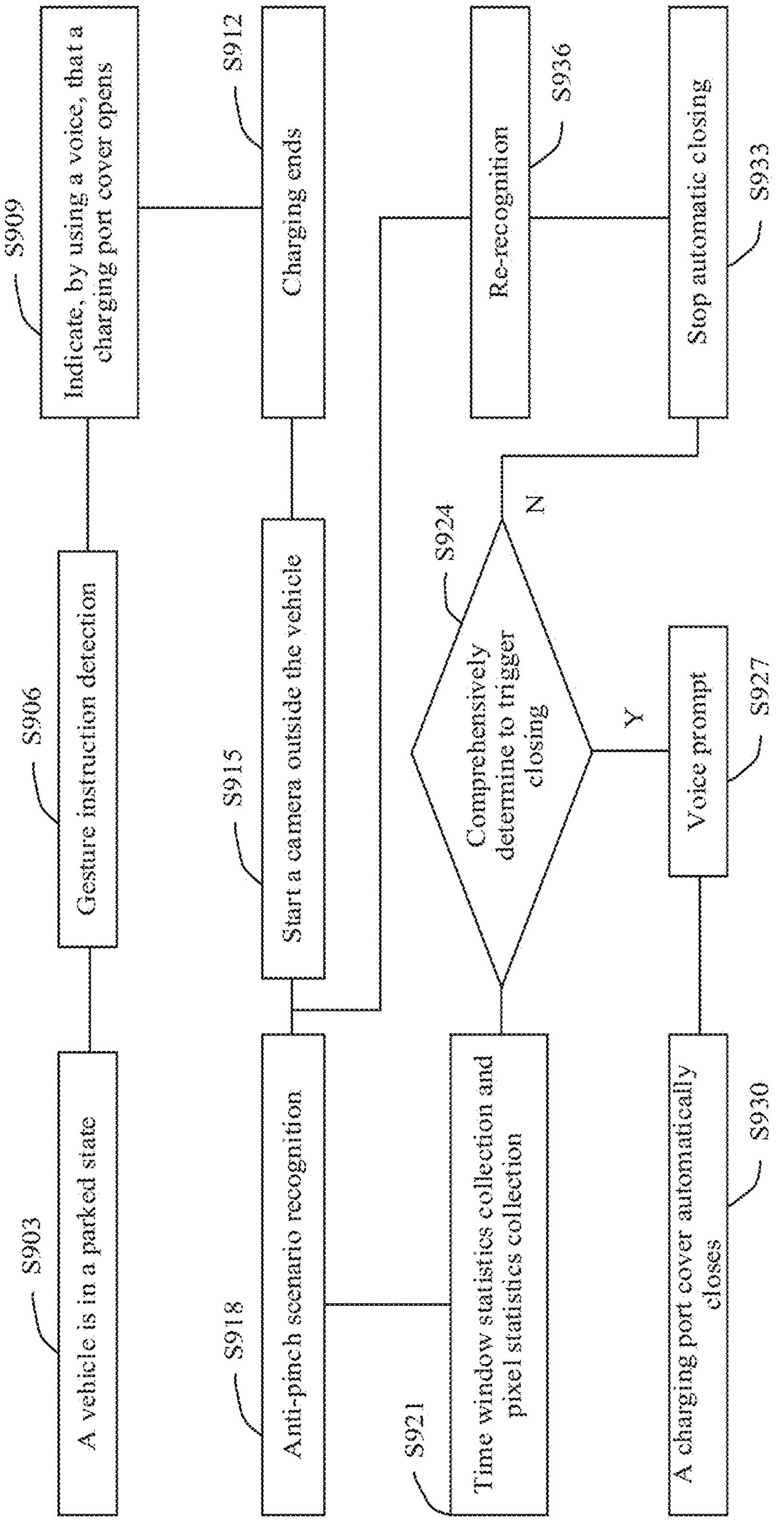
FIG. 9 is a schematic flowchart of another control method according to an embodiment of this disclosure.

For example, FIG. 9 is a schematic flowchart of another vehicle control method according to an embodiment of this disclosure. The method 900 may include some or all of the following steps.

S903: A vehicle is in a parked state.

In some possible implementations, whether the vehicle is in the parked state may be determined based on a status of a vehicle braking system, whether there is a user in a cockpit, a power supply status of the vehicle, and the like.

S906: Perform gesture instruction detection.

For example, when a gesture instruction for controlling opening of a charging port cover is detected, the charging port cover is controlled to open.

S909: Indicate, by using a voice, that the charging port cover opens.

For example, when the charging port cover is controlled to open, a user may be prompted by using a voice.

S912: Charging ends.

For example, when it is detected that a charging connector is disconnected from the vehicle (for example, it is detected that the user removes the charging connector), it may be determined that the vehicle ends a charging state.

For example, in a charging process, when remaining power of the vehicle is greater than or equal to a third threshold, a first message may be sent to prompt the user with the remaining power of the vehicle, so that the user processes the charging connector in time. In the charging process, when a first charging parameter of the charging connector does not match a second charging parameter of the vehicle, the user is prompted.

S915: Start a camera outside the vehicle.

For example, one or more cameras configured to obtain information about a surrounding environment outside the vehicle may be started, to obtain environment information around the charging port cover.

S918: Perform anti-pinch scenario recognition.

S921: Perform time window statistics collection and pixel statistics collection.

For example, for descriptions of step S918 and step S921, refer to step S836 and step S842. For brevity, details are not described herein again.

S924: Comprehensively determine whether to trigger closing.

For example, for a description of determining, based on a time window statistics collection result and a pixel statistics collection result, whether to control the charging port cover to close, refer to step S845.

In some possible implementations, when a distance between a human body part like a hand, an arm, or a head and the charging connector cover is less than or equal to a preset threshold (for example, 20 centimeters or 15 centimeters), the charging port cover may not be controlled to close, and anti-pinch scenario recognition may be performed again, for example, S933 is performed.

In some possible implementations, when the distance between the human body part like a hand, an arm, or a head and the charging connector cover is greater than or equal to the preset threshold, and the human body part moves in a direction away from the charging port, the charging port cover may be controlled to open, for example, S927 is performed.

S927: Indicate, by using a voice, that the charging port cover closes.

For example, a user may also be prompted by an indicator light controlled to be turned on, turned off, intermittently turned on or turned off, or the like.

S930: The charging port cover closes.

For example, when it is determined that the charging port cover can be controlled to close, an execution mechanism that performs an operation of closing a charging connector cover may close the charging connector cover.

For example, after the charging port cover closes, the camera outside the vehicle may be closed. For example, after the charging port cover closes, when it is detected that the user starts the vehicle, the camera configured to obtain an image of an environment around a charging port may be closed. For another example, after the charging port cover closes, if it is detected, within preset duration (for example, 1 minute or 2 minutes), that the user has no intention of continuing charging the vehicle, the camera may be closed. The preset duration may alternatively be other duration.

For example, for a description of controlling the charging port cover to close, refer to step S430.

S933: Stop automatic closing.

For example, when it is determined, based on a time window statistics collection result and a pixel statistics collection result, that the user may be pinched when the charging port cover closes, automatic closing may be stopped. For example, before a charging port cover closes, it is determined, based on a time window statistics collection result and a pixel statistics collection result, that a human body part of a user is located near a charging port. For example, when a distance between the human body part and the charging port cover is less than or equal to a preset distance, it may be considered that the user may be pinched when the charging port cover is controlled to close at this moment, and the recognition of an anti-pinch scenario is terminated, to stop closing of the charging port cover. For another example, when the charging port cover is in a closing process, the closing process of the charging port cover may be stopped when it is determined, based on a time window statistics collection result and a pixel statistics collection result, that the user may be pinched when the charging port cover continues closing at this moment. For another example, after specific time (for example, five seconds or seven seconds), the anti-pinch scenario recognition may be triggered again. In other words, S936 may be performed, so that the anti-pinch scenario recognition may be performed based on data of the camera outside the vehicle.

S936: Re-trigger anti-pinch scenario recognition.

For example, after automatic closing of the charging port cover is stopped, step S918 may be performed after preset time, to trigger anti-pinch scenario recognition again, so that the charging port cover can automatically close.

In this embodiment of this disclosure, in an entire vehicle charging process, the charging port cover automatically opens through in-vehicle gesture sensing. After charging ends, an anti-pinch scenario is recognized, so that a user can be prevented from being pinched and injured when the charging port cover closes. After a scenario is safe, the charging port cover can be controlled to automatically close. This improves intelligent experience.

Figure 10:
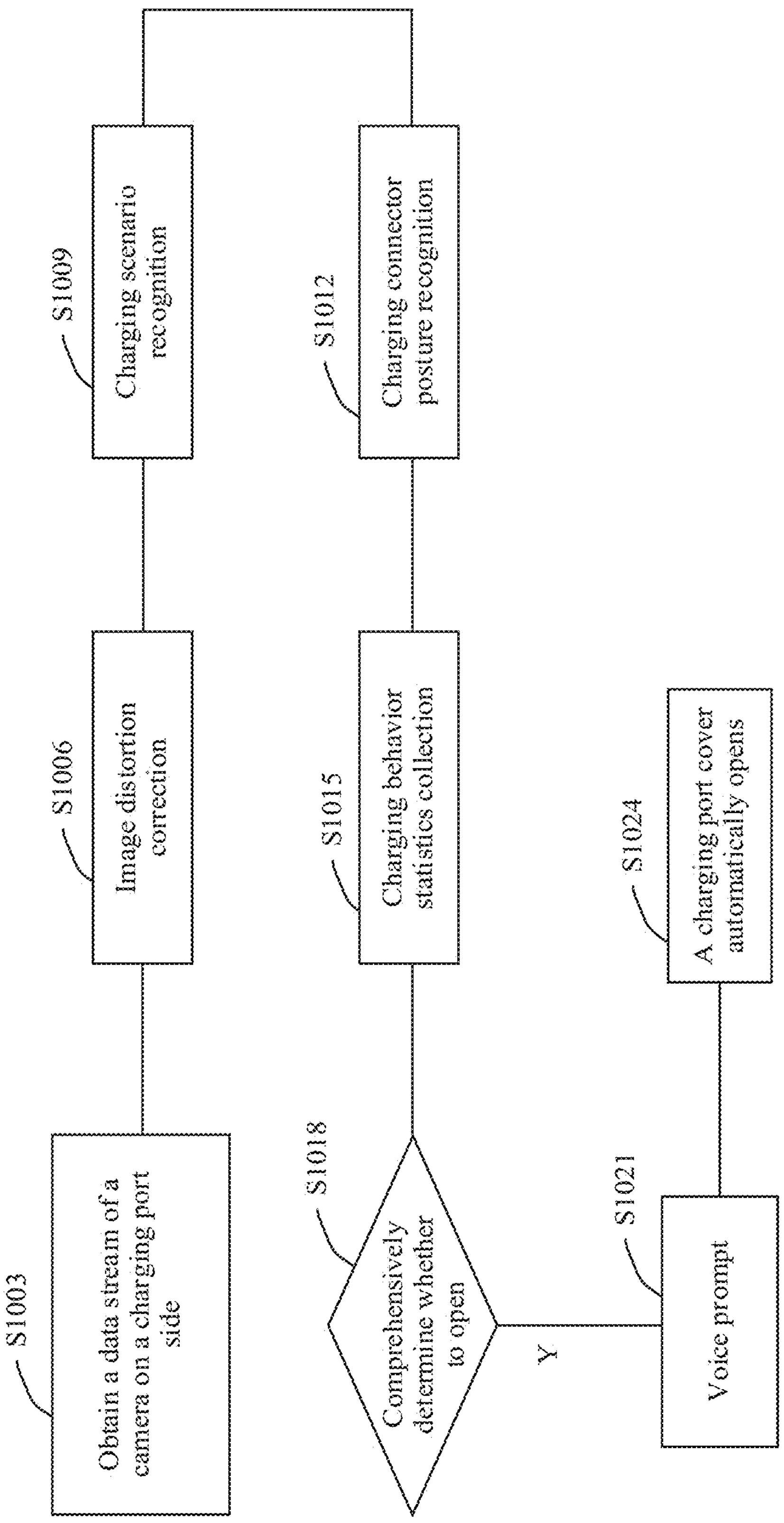
FIG. 10 is a schematic flowchart of another control method according to an embodiment of this disclosure.

For example, FIG. 10 is a schematic flowchart of another control method according to an embodiment of this disclosure. The method 1000 may include some or all of the following steps.

S1003: Obtain a data stream of a camera on a charging port side.

For example, data collected by a camera corresponding to a vehicle charging port may be obtained. The data collected by the camera may be an image, or may be a video including a plurality of images. For example, as shown in FIG. 3, when a charging port is located at a location of 308, an image collected by a left side-view camera and/or a left fisheye camera of the vehicle may be obtained.

S1006: Perform image distortion correction.

For example, for an image distortion correction method, refer to other approaches.

S1009: Perform charging scenario recognition.

For example, for content of charging scenario recognition, refer to step S817, step S430, and the like.

S1012: Perform charging connector posture recognition.

For example, a posture of a charging connector may be recognized based on an image. For example, an image of a charging connector in an obtained image may be shown in FIG. 2A, FIG. 2B, and FIG. 2C. Therefore, correspondingly, a posture of the charging connector may be determined. For another example, the posture of the charging connector may be determined based on a charging connector detection model and the image. For another example, the charging connector is compared, based on the image, with a charging connector in a corresponding posture in a database, to determine the posture of the charging connector.

In an actual scenario, when a user holds the charging connector, movement of an arm and a hand of the user may cause a change in a posture of the charging connector. In this embodiment of this disclosure, accuracy of determining a location and a motion status of the charging connector can be improved by recognizing the posture of the charging connector. This can improve accuracy of controlling movement of the charging port cover.

S1015: Perform charging behavior statistics collection.

For example, the location and the motion status of the charging connector may be determined based on pixel statistics collection and time window statistics collection. In some possible implementations, the location and the motion status of the charging connector may be determined with reference to the posture of the charging connector. For example, the location and the motion status of the charging connector may be determined based on image data within specific time (for example, three seconds or five seconds) and recognition of the posture of the charging connector, to determine whether to open the charging port cover.

For example, for a description of step S1015, refer to step S821 and step S824. Details are not described herein again.

S1018: Comprehensively determine whether to open.

S1021: Perform a voice prompt.

S1024: The charging port cover automatically opens.

For example, after the charging port cover automatically opens, the camera sensor may be disabled, to reduce sensor power consumption.

It should be understood that, for descriptions of step S1018 and step S1024, refer to step S827 to step S830, and the like.

In this embodiment of this disclosure, it is determined that the charging connector approaches the charging port cover, and the charging port cover is controlled to open, so that the user does not need to touch the charging port cover when charging the vehicle by using the charging connector. This can improve use experience of the user.

Figure 11:
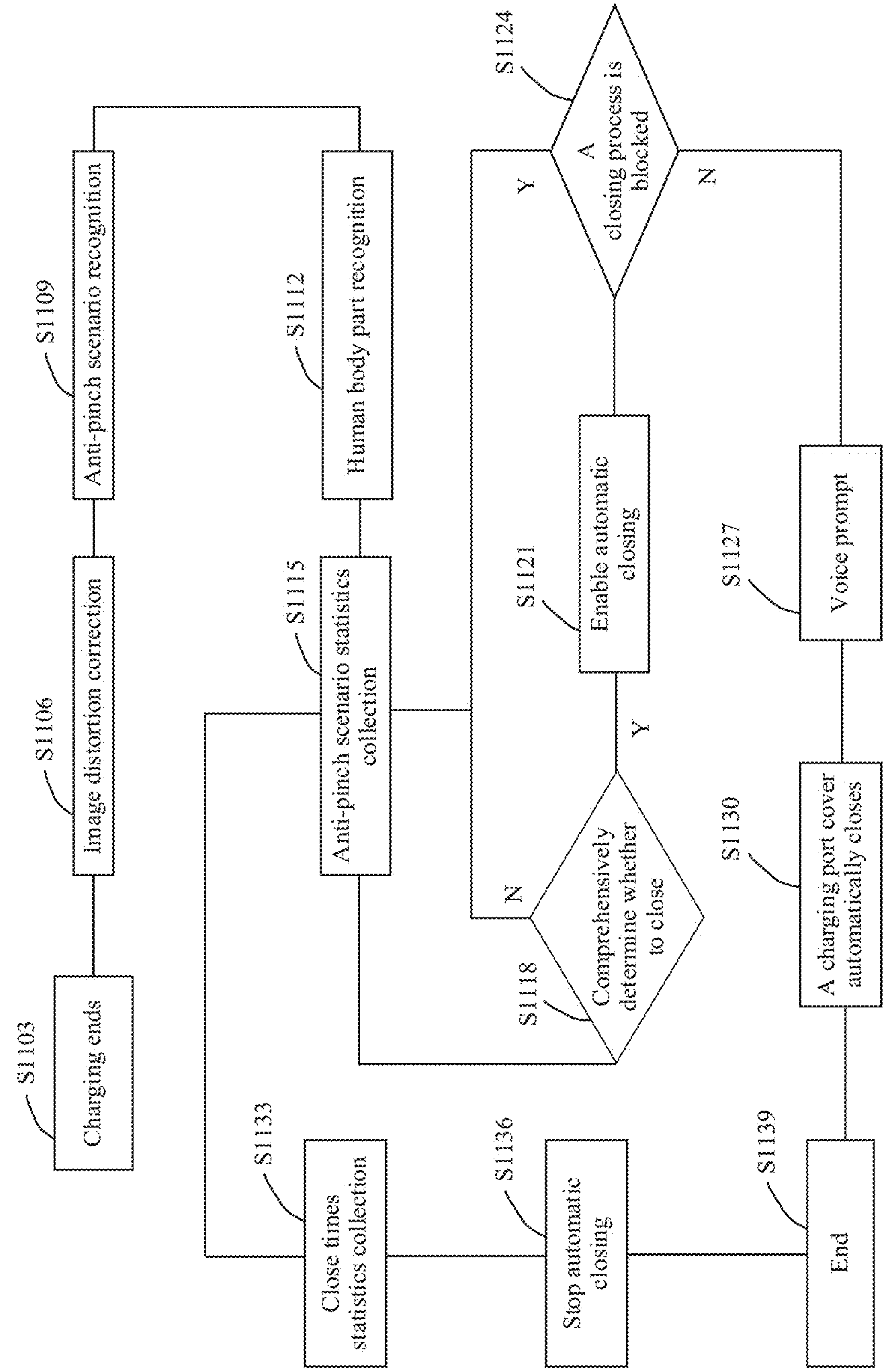
FIG. 11 is a schematic flowchart of another control method according to an embodiment of this disclosure.

For example, FIG. 11 is a schematic flowchart of another control method according to an embodiment of this disclosure. The method 1100 may include some or all of the following steps.

S1103: Charging ends.

For example, when a charging connector is disconnected from a vehicle, it may be determined that the vehicle ends a charging state. When it is determined that the vehicle ends the charging state, a sensor like a camera configured to collect an image of an environment around a charging port cover may be enabled.

S1106: Perform image distortion correction.

S1109: Perform anti-pinch scenario recognition.

For example, for a description of step S1109, refer to step S839, step S430, and the like.

S1112: Perform human body part recognition.

For example, a human body part located near the charging port cover may be determined based on image information. For example, it may be determined whether a hand, an arm, a leg, or the like of a human body is close to the charging port cover, or a head or a face of the human body is close to the charging port cover (for example, a face of a child is close to a charging port due to play, curiosity, or the like). In this way, a part of the human body that is close to the charging port cover may be determined. Furthermore, a location and a motion status of the human body may be determined. This can avoid analyzing a plurality of parts of the human body at the same time, to reduce calculation complexity of the operation, and can also reduce interference caused by an analysis result of a useless part.

For example, a posture of the human body part is correspondingly determined based on the recognized human body part, to determine a location and a motion status of the part. This can improve accuracy of the determined location and motion status.

S1115: Perform anti-pinch scenario statistics collection.

For example, the location and the motion status of the human body part may be determined based on pixel statistics collection and time window statistics collection. In some possible implementations, the location and the motion status of the human body part may be determined with reference to a posture of the charging connector.

In this embodiment of this disclosure, the human body part is recognized to determine the posture of the part, so that accuracy of determining the location and the motion status of the human body part that is close to the charging port cover can be improved. This can improve accuracy of controlling movement of the charging port cover.

S1118: Comprehensively determine whether to close.

For example, for a description of comprehensively determining whether to close the charging port cover, refer to step S845, step S924, and the like.

For example, when it is determined that the charging port cover can be closed, S1121 may be performed, to implement automatic closing of the charging port cover. When closing the charging port cover may pinch and hurt a user, S1115 may be performed.

S1121: Enable automatic closing.

For example, when it is determined that closing of the charging port cover does not pinch the user, a function that the charging port cover automatically closes may be enabled, to implement automatic closing of the charging port cover.

S1124: Determine whether a closing process is blocked.

For example, when it is determined that the closing process is blocked, step S1115 may be performed, to re-detect the human body part around the charging port cover.

S1127: Perform a voice prompt.

S1130: The charging port cover automatically closes.

S1133: Perform close times statistics collection.

For example, a quantity of times that the charging port cover is controlled to close may be counted since charging ends. For example, after charging ends, when a process in which the charging port cover closes is not blocked, the charging port cover may automatically close, and the charging port cover may be controlled to close only once. For another example, when the process in which the charging port cover closes is blocked, the charging port cover is controlled to close for a plurality of times. A quantity of times of failure of the closing process may be determined by counting a quantity of the close times. Therefore, whether an action of the charging port cover is normal may be determined, to avoid damage caused by an obstacle like a dried branch, a fallen leaf, or a small rock in the process in which the charging port cover closes.

It should be understood that an execution sequence of step S1133 and step S1118 is not limited in this embodiment of this disclosure.

S1136: Stop automatic closing.

For example, when the quantity of close times is greater than or equal to a preset threshold (for example, four times or five times), the function that the charging port cover automatically closes may be stopped.

S1139: End.

For example, after the function that the charging port cover automatically closes is terminated, or the charging port cover automatically closes, the camera that collects the image of the environment around the charging port cover may be closed.

In this embodiment of this disclosure, in a process in which the charging port cover automatically closes after charging ends, when there is a human body part around the charging port cover, it is determined that the user is in a safe area, so that the user can be prevented from being pinched and injured in the process in which the charging port cover closes. When the charging port cover fails to close, whether to terminate the function that the charging port cover automatically closes may be determined based on the quantity of close times of the charging port cover, to avoid that the charging port cover is stuck by an obstacle and the charging port cover continuously tries to close. This can avoid damage to the vehicle caused by the process.

Methods provided in embodiments of this disclosure are described in detail above with reference to FIG. 4 to FIG. 11. It should be understood that the method 400, the method 800, the method 900, and the method 1100 may be combined with each other. For content that is not described in detail, refer to the foregoing method embodiments. For brevity, details are not described herein again.

Figure 12:
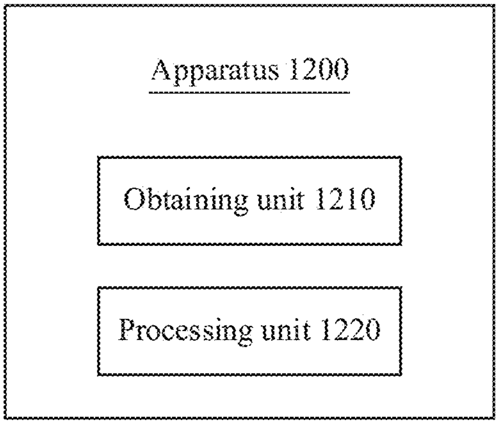
FIG. 12 is a schematic diagram of a structure of a control apparatus according to an embodiment of this disclosure.

An embodiment of this disclosure further provides an apparatus configured to implement any one of the foregoing methods. For example, the apparatus includes units configured to implement steps performed by a chip, a vehicle, a head unit system, and the like in any one of the foregoing methods. For example, FIG. 12 is a schematic diagram of a structure of a vehicle control apparatus according to an embodiment of this disclosure. The apparatus 1200 may include an obtaining unit 1210 and a processing unit 1220.

The obtaining unit 1210 may be configured to obtain environment information around a charging port cover of a vehicle.

The processing unit 1220 may be configured to recognize a charging connector based on the environment information, and control the charging port cover to open when a distance between the charging connector and the charging port cover is less than or equal to a first threshold.

Optionally, the obtaining unit 1210 may be configured to obtain the environment information around the charging port cover of the vehicle when the vehicle is in a parked state.

Optionally, the processing unit 1220 may be further configured to control a first sensor of the vehicle to be in an enabled state when a distance between a user of the vehicle and the vehicle is less than or equal to a second threshold, and the charging port cover of the vehicle is in a closed state, and the obtaining unit 1210 may be configured to obtain the environment information around the charging port cover of the vehicle through the first sensor.

Optionally, the processing unit 1220 may be configured to control the charging port cover to open when it is detected that the distance between the charging connector and the charging port cover is less than or equal to the first threshold, and the charging connector moves towards a location of the charging port cover.

For example, for descriptions of the first sensor, the user of the vehicle, displacement information, and the like, refer to the method 400 to the method 1100.

For example, controlling the first sensor to be in the enabled state may be that the processing unit 1220 directly controls the first sensor to be in the enabled state, or may be that the first sensor is controlled to be in the enabled state by another control apparatus. For example, the apparatus 1200 may further include a transceiver unit 1230, and the processing unit 1220 may also be configured to control the transceiver unit 1230 to send an indication message, to indicate another apparatus like a chip, a processor, or a vehicle-mounted terminal to control the first sensor to be in the enabled state. The transceiver unit 1230 may be connected, by using an internal circuit of the vehicle, to the apparatus for receiving the indication message. Similarly, controlling the charging port cover to open is similar.

Optionally, the obtaining unit 1210 may be further configured to obtain a first location and a second location when the charging connector is recognized, where the first location is a location of the charging connector at a first moment, the second location is a location of the charging connector at a second moment, and the first moment is earlier than the second moment, and the processing unit 1220 may be configured to control the charging port cover to open when it is determined that a distance between the second location and the charging port cover is less than or equal to the first threshold, and the distance between the second location and the charging port cover is less than a distance between the first location and the charging port cover.

For example, for descriptions of the first moment, the second moment, the second threshold, the first location, the second location, and the like, refer to step S420, step S430, and the like.

Optionally, the obtaining unit 1210 may be further configured to obtain characteristic information of the charging connector, and the processing unit 1220 may be configured to control the charging port cover to open when it is determined, based on the characteristic information, that the charging connector adapts to the charging port cover.

For example, for descriptions related to the characteristic information of the charging connector and a matching characteristic, refer to step S430.

Optionally, the processing unit 1220 may be configured to control the charging port cover to open when the user of the vehicle holds the charging connector, and the distance between the charging connector and the charging port cover is less than or equal to the first threshold.

Optionally, the processing unit 1220 may be configured to control the charging port cover to open when the distance between the user of the vehicle and the vehicle is less than or equal to a preset threshold, when it is detected that the distance between the charging connector and the charging port cover is less than or equal to the first threshold, and when the charging connector is held by an authorized user of the vehicle.

For example, for descriptions of the user of the vehicle, the authorized user of the vehicle, and the like, refer to step S430.

Optionally, the apparatus may further include a sending unit 1230. The sending unit 1230 may be configured to send a first message when the charging connector charges the vehicle, and remaining power of the vehicle is greater than or equal to a third threshold, where the first message indicates the remaining power of the vehicle.

Optionally, the obtaining unit 1210 may be further configured to obtain a first charging parameter of the charging connector, and the processing unit 1220 may be further configured to, when the first charging parameter does not match a second charging parameter of the vehicle, inform the user that there is an exception in a charging process.

Optionally, the processing unit 1220 may be further configured to control the charging port cover to close when the charging port cover is in an open state, and when it is detected that the user removes the charging connector from a charging port of the vehicle.

For example, whether the user removes the charging connector from the charging port of the vehicle may be determined based on a change of an electrical signal at the charging port, or it may be determined, with reference to image information collected by a camera, that the charging connector is located outside the charging port.

Optionally, the obtaining unit 1210 may be further configured to obtain a distance between a first human body part and the charging port cover, and the processing unit 1220 may be further configured to control the charging port cover to close when the charging port cover is in the open state, when it is detected that the user removes the charging connector from the charging port of the vehicle, and when the distance between the first human body part and the charging port cover is greater than or equal to a fourth threshold.

For example, the first human body part may be a human body part like a hand, an arm, or a head.

Optionally, the obtaining unit 1210 may be further configured to obtain a quantity of failure times when an operation of closing the charging port cover fails, and the processing unit 1220 may be further configured to, when the quantity of failure times is greater than or equal to a fifth threshold, interrupt performing the operation of closing the charging port cover, and inform the user that the charging port cover fails to close, and indicate to check the charging port cover.

For example, for descriptions of obtaining the quantity of failure times, refer to steps S430, S1133, and the like.

In some possible implementations, the processing unit 1220 may be further configured to inform the user that the charging port cover is to close when the charging port cover is controlled to close.

In some possible implementations, the processing unit 1220 may be further configured to inform the user that the charging port cover is to open when the charging port cover is controlled to open.

For example, the vehicle may include a prompt apparatus. Correspondingly, the processing unit may be configured to control the prompt apparatus to prompt the user. For example, the processing unit 1220 may be configured to control sending of a prompt message, where the prompt message may indicate that the charging port cover is about to move. The prompt apparatus may directly obtain the prompt message from the processing unit, or may obtain the prompt message by using another apparatus. Alternatively, another control apparatus may control the prompt apparatus to prompt the user after obtaining the prompt message. For another example, the prompt apparatus may inform, by using a voice, a prompt tone, a prompt light, or the like, the user that the charging port cover is to open or close.

Optionally, the obtaining unit 1210 may be further configured to obtain data collected by a second sensor, where a sensing range of the second sensor is different from a sensing range of the first sensor, and the processing unit 1220 is further configured to determine the distance between the user of the vehicle and the vehicle based on the data collected by the second sensor, and when the distance between the user of the vehicle and the vehicle is less than or equal to the second threshold, and the charging port cover is in the closed state, control the first sensor to be in the enabled state, and disable the second sensor.

It should be understood that operations/behaviors such as obtaining, storing, using, and processing user information in this disclosure are compliant use in compliance with local laws and regulations. For example, operations such as obtaining, storing, using, and processing user information in this patent indicate operations performed with personal consent.

It should be understood that division into units in the apparatus is merely logical function division. During actual implementation, all or some of the units may be integrated into one physical entity or may be physically separated. In addition, a unit in the apparatus may be implemented in a form of a processor invoking software. For example, the apparatus includes a processor, the processor is connected to a memory, the memory stores instructions, and the processor invokes the instructions stored in the memory, to implement any one of the foregoing method or functions of units in the apparatus. The processor is, for example, a general purpose processor, for example, a CPU or a microprocessor, and the memory is a memory in the apparatus or a memory outside the apparatus. Alternatively, a unit in the apparatus may be implemented in a form of a hardware circuit, and functions of some or all units may be implemented by designing the hardware circuit. The hardware circuit may be understood as one or more processors. For example, in an implementation, the hardware circuit is an ASIC, and functions of some or all units are implemented by designing a logical relationship between elements in the circuit. For another example, in another implementation, the hardware circuit may be implemented by using a PLD, an FPGA is used as an example, the field programmable gate array may include a large quantity of logic gate circuits, and a connection relationship between the logic gate circuits is configured by using a configuration file, to implement functions of some or all of the foregoing units. All the units of the foregoing apparatus may be implemented in a form of software invoked by a processor, or may be implemented in a form of a hardware circuit, or some of the units are implemented in a form of software invoked by a processor, and the remaining units are implemented in a form of a hardware circuit.

In this embodiment of this disclosure, the processor is a circuit having a signal processing capability. In an implementation, the processor may be a circuit having an instruction reading and running capability, for example, a CPU, a microprocessor, a GPU, or a DSP. In another implementation, the processor may implement a specific function by using a logical relationship of a hardware circuit, and the logical relationship of the hardware circuit is fixed or may be reconstructed. For example, the processor is a hardware circuit implemented by an ASIC or a PLD, for example, an FPGA. In a reconfigurable hardware circuit, a process in which the processor loads a configuration file to implement hardware circuit configuration may be understood as a process in which the processor loads instructions to implement functions of some or all of the foregoing units. In addition, the processor may be a hardware circuit designed for artificial intelligence, and may be understood as an ASIC, for example, an NPU, a TPU, or a DPU.

It can be learned that the units in the foregoing apparatus may be configured as one or more processors (or processing circuits) for implementing the foregoing method, for example, a CPU, a GPU, an NPU, a TPU, a DPU, a microprocessor, a DSP, an ASIC, an FPGA, or a combination of at least two of these processor forms.

In addition, all or some of the units in the foregoing apparatus may be integrated, or may be implemented independently. In an implementation, the units may be integrated together and implemented in a form of a system-on-a-chip (SOC). The SOC may include at least one processor configured to implement any one of the foregoing method or implement functions of units of the apparatus. Types of the at least one processor may be different, for example, include a CPU and an FPGA, a CPU and an artificial intelligence processor, a CPU and a GPU, and the like.

In a specific implementation process, operations performed by the obtaining unit 1210 and the processing unit 1220 may be performed by a same processor, or may be performed by different processors, for example, may be performed by a plurality of processors. For example, the one or more processors may be connected to sensors in the display apparatus 130 and the sensing system 120 in FIG. 1, and obtain environment information around the charging port cover from the sensors in the display apparatus 130 and the sensing system 120. For another example, the one or more processors may recognize the charging connector based on the environment information. For another example, the one or more processors may determine a distance between the charging connector and the charging port cover. For another example, the one or more processors may be configured to control opening of the charging port cover. For example, in a specific implementation process, the one or more processors may be a processor disposed in a head unit, or may be a processor disposed in another vehicle-mounted terminal. For example, in a specific implementation process, the apparatus 1200 may be a chip disposed in a head unit or another vehicle-mounted terminal. For example, in a specific implementation process, the apparatus 1200 may be the computing platform 150 shown in FIG. 1 that is disposed in the vehicle.

An embodiment of this disclosure further provides an apparatus. The apparatus 1300 may include a processing unit and a storage unit. The storage unit is configured to store instructions, and the processing unit executes the instructions stored in the storage unit, so that the apparatus performs the method or the steps in any one of the embodiments in FIG. 4 to FIG. 11.

Optionally, the processing unit may include at least one processor. The storage unit may be a memory. The memory may be a storage unit (for example, a register or a cache) in a chip, or may be a storage unit (for example, a read-only memory (ROM) or a random-access memory (RAM)) in a vehicle and located outside the chip.

Optionally, if the apparatus is located in a vehicle, the processing unit may be the processor 151 to the processor **15*n* shown in FIG. 1**.

An embodiment of this disclosure further provides a transport means. The transport means may include the foregoing apparatus 1200.

For example, the transport means may be a vehicle. For example, the vehicle may include the apparatus 1200, the apparatus 1300, or the computing platform shown in FIG. 1. A charging port and a charging port cover are disposed on the vehicle. The apparatus 1200, the apparatus 1300, and the computing platform may control, by using an internal circuit of the vehicle, opening of the charging port cover based on a distance between the charging connector and the charging port cover.

An embodiment of this disclosure further provides a computer program product. The computer program product includes computer program code, and when the computer program code is run on a computer, the computer is enabled to perform the method.

An embodiment of this disclosure further provides a computer-readable medium. The computer-readable medium stores program code, and when the computer program code is run on a computer, the computer is enabled to perform the method.

For example, the computer-readable medium may include any medium that can store program code, such as a Universal Serial Bus (USB) flash drive, a removable hard disk, a ROM, a RAM, a magnetic disk, or an optical disc. This is not limited in this embodiment of this disclosure. The computer-readable medium may store program code required for running of the processing unit 1220 and/or the obtaining unit 1210. When the program code is run on a computer, the computer may perform operations performed by the processing unit and the obtaining unit. The computer may be connected to the charging port cover to control the charging port cover.

In an implementation process, steps in the foregoing methods can be implemented by using a hardware integrated logical circuit in the processor, or by using instructions in a form of software. The method of the communication disclosed with reference to embodiments of this disclosure may be directly performed by a hardware processor, or may be performed by using a combination of hardware in the processor and a software module. A software module may be located in a mature storage medium in the art, such as a RAM, a flash memory, a ROM, a programmable ROM (PROM), an electrically erasable programmable memory, or a register. The storage medium is located in the memory, and the processor reads information in the memory and completes the steps in the foregoing methods in combination with hardware of the processor. To avoid repetition, details are not described herein again.

It should be understood that in this embodiment of this disclosure, the memory may include a ROM and a RAM, and provide instructions and data to the processor.

It should be further understood that sequence numbers of the processes do not mean execution sequences in various embodiments of this disclosure. The execution sequences of the processes should be determined according to functions and internal logic of the processes, and should not be construed as any limitation on the implementation processes of embodiments of this disclosure.

Terms in embodiments of this disclosure are used only for the purpose of describing specific embodiments, but are not intended to limit this disclosure. The terms "one", "a" and "this" of singular forms used in this specification and the appended claims of this disclosure are also intended to include expressions such as "one or more", unless otherwise specified in the context clearly. It should be further understood that in the following embodiments of this disclosure, "at least one" and "one or more" refer to one, two, or more. The term "and/or" is used to describe an association relationship between associated objects and represents that three relationships may exist. For example, A and/or B may represent the following cases: only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise further emphasized in another manner. The terms "include", "have", and their variants all mean "include but are not limited to", unless otherwise further emphasized in another manner.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:

obtaining environment information of an environment within a preset range of a charging port cover of a vehicle;

recognizing, based on the environment information, a charging connector;

controlling the charging port cover to open when a first distance between the charging connector and the charging port cover is less than or equal to a first threshold;

obtaining a first charging parameter of the charging connector;

identifying that the first charging parameter does not match a second charging parameter of the vehicle; and outputting, in response to identifying that the first charging parameter does not match the second charging parameter, a notification that there is an exception in a charging process.

2. The method of claim 1, wherein obtaining the environment information comprises:

identifying that the vehicle is in a parked state; and obtaining, in response to identifying that the vehicle is in the parked state, the environment information.

3. The method of claim 1, further comprising:

controlling a first sensor of the vehicle to be in an enabled state when a second distance between a user of the vehicle and the vehicle is less than or equal to a second threshold, and when the charging port cover is in a closed state; and obtaining, through the first sensor, the environment information.

4. The method of claim 3, further comprising:

obtaining a third distance from a second sensor, wherein a second sensing range of the second sensor is different from a first sensing range of the first sensor; and controlling the first sensor to be in the enabled state and disabling the second sensor when the third distance is less than or equal to the second threshold and when the charging port cover is in the closed state.

5. The method of claim 3, further comprising disabling the first sensor when the charging connector is detected to be connected to a charging port of the vehicle.

6. The method of claim 1, wherein controlling the charging port cover to open comprises controlling the charging port cover to open when the first distance is less than or equal to the first threshold and the first distance decreases.

7. The method of claim 6, further comprising:

obtaining a first location of the charging connector at a first moment when recognizing the charging connector;

obtaining a second location at a second moment, wherein the first moment is earlier than the second moment; and further controlling the charging port cover to open when a second distance between the second location and the charging port cover is less than the first distance.

8. The method of claim 1, further comprising:

obtaining characteristic information of the charging connector;

identifying, based on the characteristic information, that the charging connector conforms to the charging port cover; and controlling, in response to identifying that the charging connector conforms to the charging port cover, the charging port cover to open.

9. The method of claim 1, wherein controlling the charging port cover comprises controlling the charging port cover to open when the vehicle detects that the charging connector is held by an authorized user of the vehicle, and when the first distance is less than or equal to the first threshold.

10. The method of claim 1, wherein controlling the charging port cover to open comprises controlling the charging port cover to open when a second distance between an authorized user of the vehicle and the vehicle is less than or equal to a second threshold, when the first distance is less than or equal to the first threshold, and when the vehicle detects that the charging connector is held by the authorized user of the vehicle.

11. The method of claim 1, further comprising sending a message when the charging connector is charging the vehicle and a remaining power of the vehicle is greater than or equal to a second threshold, and wherein the message indicates the remaining power.

12. The method of claim 1, further comprising:
identifying that the charging port cover is in an open state;
identifying that the charging connector is removed from a charging port of the vehicle; and
controlling, in response to identifying that the charging port cover is in the open state and that the charging connector is removed from the charging port, the charging port cover to close.

13. The method of claim 12, further comprising:
obtaining a second distance between a human body part and the charging port cover; and
further controlling the charging port cover to close when the second distance is greater than or equal to a second threshold.

14. The method of claim 12, further comprising:
obtaining a quantity of failure times when an operation of closing the charging port cover fails;
identifying that the quantity of failure times is greater than or equal to a second threshold;
interrupting the operation in response to identifying that the quantity of failure times is greater than or equal to the second threshold; and
informing an authorized user that the charging port cover has failed to close; and
instructing the authorized user.

15. An apparatus comprising:
a first sensor configured to obtain environment information of an environment within a preset range of a charging port cover of a vehicle; and
one or more processors coupled to the first sensor and configured to:
recognize, based on the environment information, a charging connector;
control the charging port cover to open when a first distance between the charging connector and the charging port cover is less than or equal to a first threshold;
identify that the charging port cover is in an open state;
identify that the charging connector is removed from a charging port of the vehicle;
control, in response to identifying that the charging port cover is in the open state and that the charging connector is removed from the charging port, the charging port cover to close;
obtain a second distance between a human body part and the charging port cover; and
further control the charging port cover to close when the second distance is greater than or equal to a second threshold.

16. The apparatus of claim 15, wherein the one or more processors are further configured to:
identify that the vehicle is in a parked state; and
obtain, in response to identifying that the vehicle is in the parked state, the environment information.

17. The apparatus of claim 15, wherein the one or more processors are further configured to:
control a second sensor of the vehicle to be in an enabled state when a second distance between a user of the vehicle and the vehicle is less than or equal to a second threshold and the charging port cover is in a closed state; and
to obtain, via the second sensor, is further configured to obtain the environment information.

18. The apparatus of claim 15, wherein the one or more processors are further configured to control the charging port cover to open when the first distance is less than or equal to the first threshold and the first distance decreases.

19. The apparatus of claim 18, wherein the one or more processors are further configured to:
obtain, via the first sensor, a first location of the charging connector at a first moment when recognizing the charging connector;
obtain, via the first sensor, a second location at a second moment, wherein the first moment is earlier than the second moment; and
control the charging port cover to open when a second distance between the second location and the charging port cover is less than the first distance.

20. A computer program product comprising computer-executable instructions that are stored on a non-transitory computer-readable storage medium and that, when executed by one or more processors, cause an apparatus to:
obtain environment information of an environment within a preset range of a charging port cover of a vehicle;
recognize, based on the environment information, a charging connector;
control the charging port cover to open when a distance between the charging connector and the charging port cover is less than or equal to a threshold;
identify that the charging port cover is in an open state;
identify that the charging connector is removed from a charging port of the vehicle;
control, in response to identifying that the charging port cover is in the open state and that the charging connector is removed from the charging port, the charging port cover to close;
obtain a quantity of failure times when an operation of closing the charging port cover fails;
identify that the quantity of failure times is greater than or equal to a second threshold;
interrupt the operation in response to identifying that the quantity of failure times is greater than or equal to the second threshold; and
output a notification that the charging port cover has failed to close and to check the charging port cover.

* * * * *